US010239771B2

(12) United States Patent
Norman et al.

(10) Patent No.: US 10,239,771 B2
(45) Date of Patent: Mar. 26, 2019

(54) ELECTROCOAGULATION UNIT

(71) Applicant: WATER VISION, INC., Katy, TX (US)

(72) Inventors: Gregory K. Norman, Katy, TX (US); Xandra Joines Turner, Sugar Land, TX (US); Joshua Hebert, Houston, TX (US); Jason Michael Kirk, Katy, TX (US)

(73) Assignee: Water Vision, Inc., Katy, TX (US)

( * ) Notice: Subject to any disclaimer, the term of this patent is extended or adjusted under 35 U.S.C. 154(b) by 0 days.

(21) Appl. No.: 16/041,700

(22) Filed: Jul. 20, 2018

(65) Prior Publication Data
US 2019/0023589 A1 Jan. 24, 2019

Related U.S. Application Data

(60) Provisional application No. 62/535,564, filed on Jul. 21, 2017.

(51) Int. Cl.
C02F 1/463 (2006.01)
C02F 1/461 (2006.01)
C02F 9/00 (2006.01)
C02F 101/20 (2006.01)
C02F 103/36 (2006.01)

(52) U.S. Cl.
CPC .......... C02F 1/463 (2013.01); C02F 1/46109 (2013.01); C02F 9/00 (2013.01); C02F 2001/46133 (2013.01); C02F 2101/20 (2013.01); C02F 2103/365 (2013.01); C02F 2201/46 (2013.01)

(58) Field of Classification Search
CPC ....................................................... C02F 1/463
See application file for complete search history.

(56) References Cited

U.S. PATENT DOCUMENTS

| 2,079,950 | A | * | 5/1937 | Negus | ................. | C02F 1/46104 |
| | | | | | | 137/571 |
| 6,210,648 | B1 | | 4/2001 | Gathje et al. | | |
| 2002/0020631 | A1 | | 2/2002 | Gavrel et al. | | |
| 2003/0173262 | A1 | | 9/2003 | Jounela | | |
| 2004/0140256 | A1 | | 7/2004 | Dew | | |
| 2011/0308938 | A1 | * | 12/2011 | Gilmore | ............. | C02F 1/46109 |
| | | | | | | 204/228.6 |
| 2016/0083053 | A1 | | 3/2016 | Gallagher | | |
| 2017/0158538 | A1 | | 6/2017 | Seth et al. | | |

FOREIGN PATENT DOCUMENTS

WO 2016057286 4/2016

OTHER PUBLICATIONS

Search Report and Written Opinion dated Oct. 2, 2018 for Intl App No. PCT/US2018/043189 (28 pages).

* cited by examiner

Primary Examiner — Salil Jain
(74) Attorney, Agent, or Firm — Rao DeBoer Osterrieder, PLLC; John M. DeBoer

(57) ABSTRACT

An electrocoagulation unit that may include an outer shell, and a set of electrodes disposed within the inner housing. Each electrode is separated from an adjacent electrode by an electrode gap spacing. The outer shell may further include a fluid inlet; a fluid outlet; a first busbar opening with a first busbar gland associated therewith.

18 Claims, 19 Drawing Sheets

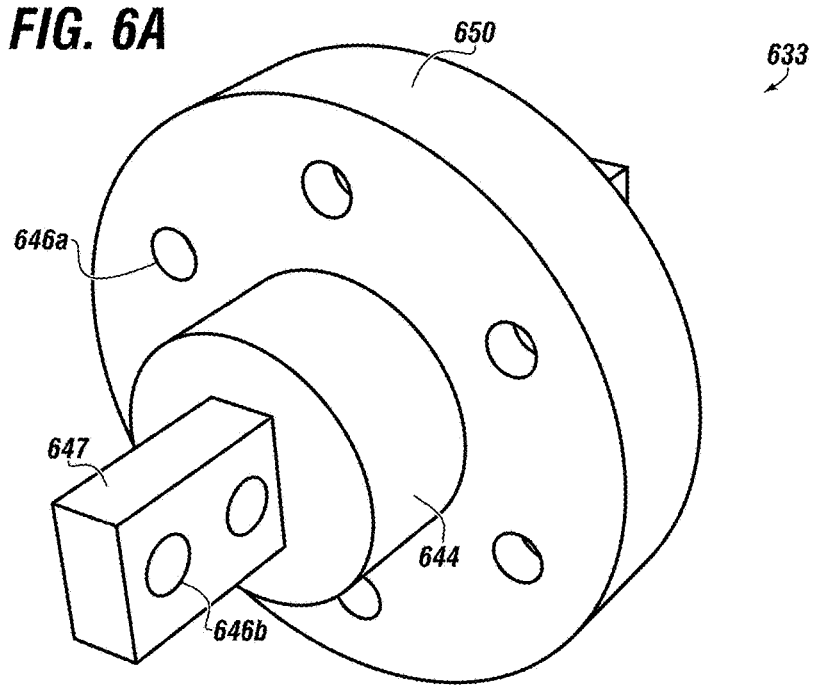

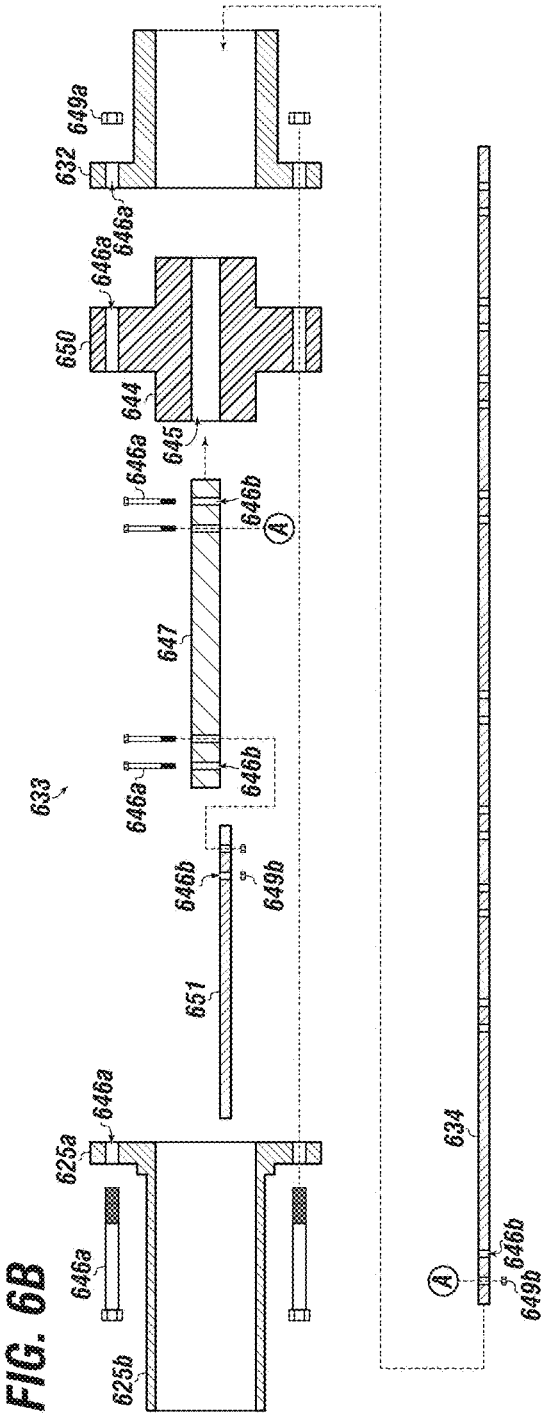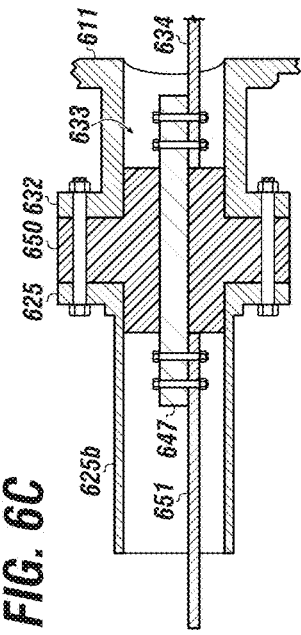

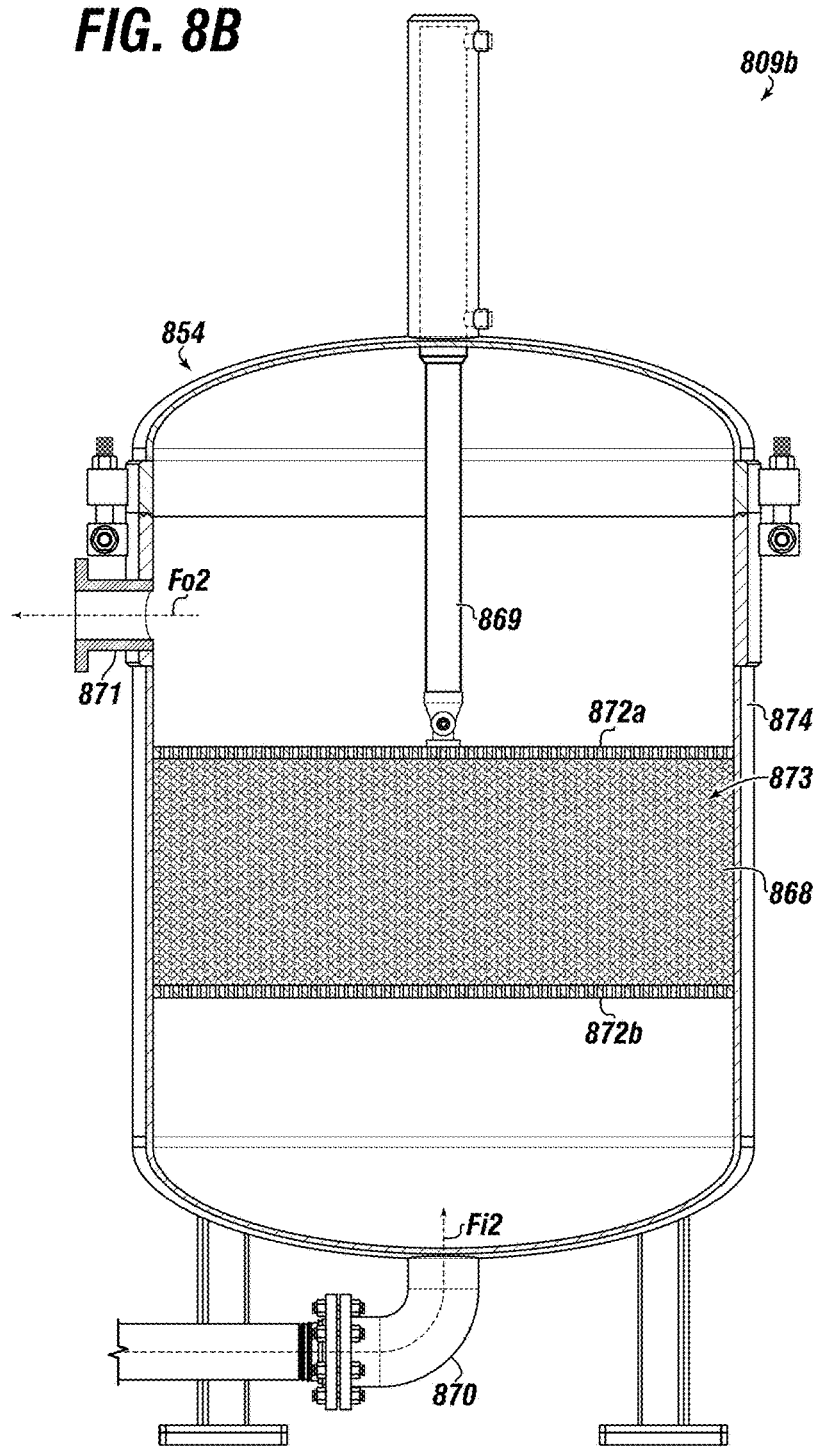

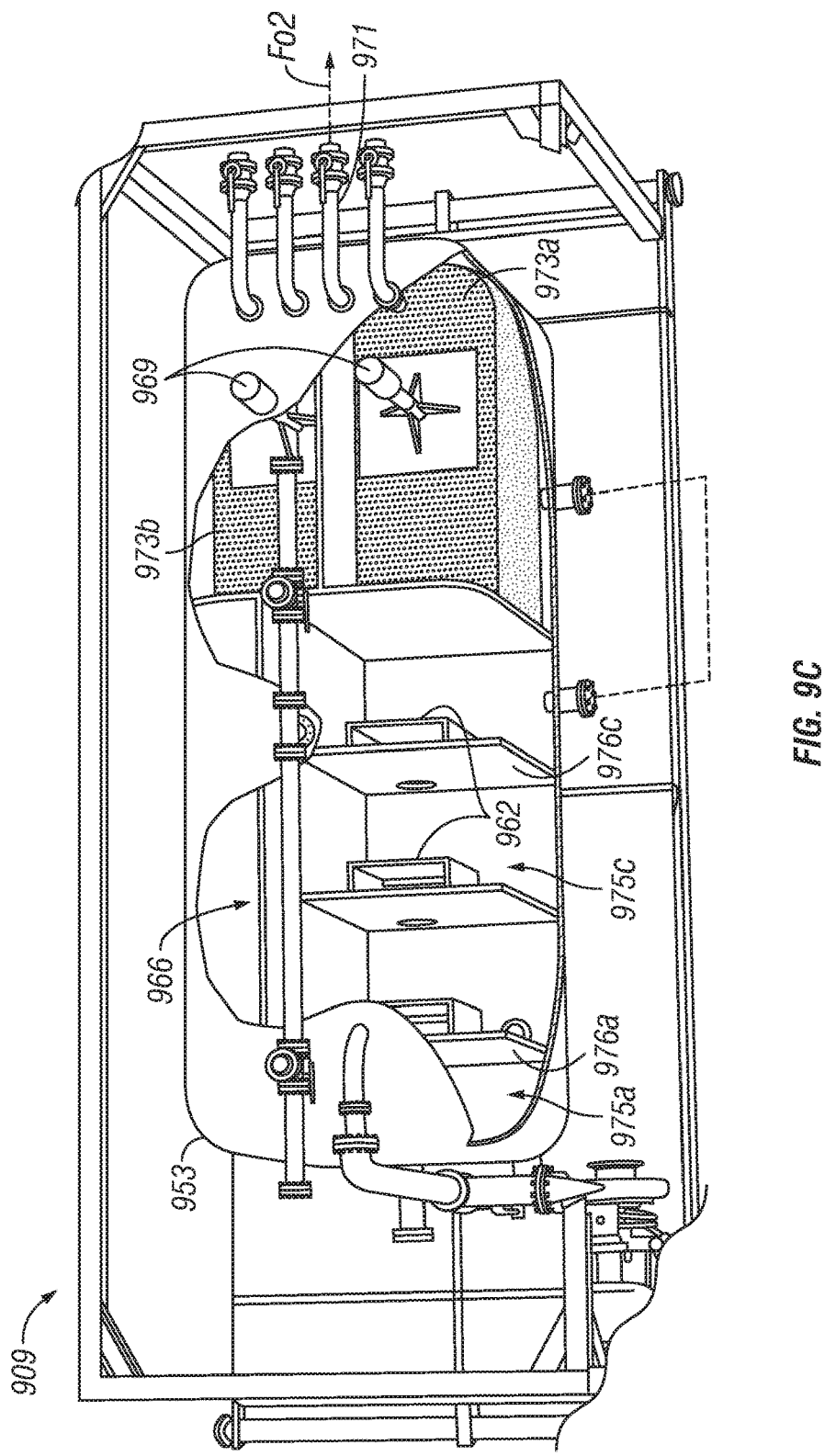

ELECTROCOAGULATION UNIT

BACKGROUND

Field of the Disclosure

This disclosure generally relates to processes and systems, and related units, for improved treatment of a fluid. Particular embodiments herein relate to removing impurities and other contaminants, for example organics, from liquids such as water, using an electrochemical process. Other embodiments herein relate to the use of electrocoagulation (EC) for the treatment of water in an offshore environment, such as on or in association with a Floating Production Storage and Offloading (FPSO) vessel.

Background of the Disclosure

In many respects, clean water may be thought of as the most in-demand commodity around the world. The need for clean water is prevalent in today's residential, municipal, and industrial settings. One area of relevance is the oil and gas (O&G) industry, where consumption of clean water, and production of contaminated water, continue to dramatically rise. To be sure, the background of the disclosure and embodiments herein are relevant elsewhere, such as agricultural, medical, or wastewater treatment, be it onshore or offshore, as well as other fluids, but for brevity may focus on water and O&G.

Generally speaking, produced water may be a single- or multi-phase composition produced from an underground formation to the surface during oil and gas production. Produced water may include solids, dispersed oil, dissolved organic compounds, production chemicals, heavy metals, and even radioactive minerals. Some of these elements occur naturally in produced water while others may be chemicals previously used for well-stimulation, completion, production, etc.

Produced water may come from other sources as well. For example, slop tanks, flowbacks, and frac water all represent produced water streams that do not actually originate from underground formations.

While produced water presents its own challenges in an onshore setting, it is nothing short of problematic for offshore. Not only must the produced water be treated to a level sufficient to allow it to be discharged into the ocean, reinjected into a disposal well, or shipped to shore via limited pipeline capacity, but deck space and weight limits for offshore vessels is extremely limiting.

Offshore treatment routinely defers to chemical treatment, followed by mechanical treatment, followed by filtration. Typical offshore treatment skids require a significant footprint for associated equipment—just getting the equipment onto a vessel as a first step is a cost-prohibitive logistical quagmire. Filtration skids alone demand extensive amount of filtration media that rapidly foul and require constant operator attention. Conventional systems like this employ filter cartridges or bulk media to adsorb organics and remove or reduce solids. On an offshore operation, the space necessary to store the cartridges both new and expended is a source of operational, safety, economic and liability concerns (the same also apply to onshore).

Electrocoagulation (EC) is a different type of treatment process used by a variety of industries (particularly water related) to destabilize contaminants and hold them in solution using an electrical charge. EC uses an oxidation-reduction (redox) reaction as is known to one of skill in the art. FIG. 1 illustrates a conventional EC process 100 that traditionally utilizes an EC unit 111 configured with an anode 112 and a cathode 113 separated by a distance or gap (exaggerated here) 115, stimulated by a power source 114.

A fluid (or inlet fluid) $F_i$ for treatment is fed to the unit 111 by way of an inlet 116. Suspended, stabilized and emulsified contaminants exist in fluid. Water in particular is suitable for EC, as it is polar and holds contaminants, such as heavy metals and colloids, in solution with electrical charges. When power is applied, suspended and stabilized contaminants are destabilized, and break into smaller particles, and emulsified fluids are de-emulsified. The power connection is typically 'dry' (i.e., the connection point between the electrode and the power line is not within a liquid such as water).

Electrons 121 produced during EC affect the polarity of the fluid allowing contaminant materials to precipitate. Resultant metal ions 120 form in-situ chemical coagulant that destabilize, change or neutralize contaminant charges, resulting in formation of 'floc' or 'flocculent' 118 (sometimes also 'concentrated sludge' 118a). The floc 118 may float to the surface (or sink) as a result of differences in density. The treated fluid and generated floc $F_o$ will exit the unit via outlet 117 for further processing to remove the generated floc.

However, conventional EC is underpinned with a myriad of problems. First, during the EC process, electrodes are sacrificed in order to produce coagulating ions, and become coated and fouled (sometimes rapidly) with a non-conducting oxide—this is particularly the case when processing wastewater with high concentrations of dissolved solids and scaling potential. Known as 'passivation', this results in the EC process having reduced efficiency, increased power consumption, spatial considerations, time-consuming maintenance, cleaning (with hazardous chemicals), higher costs for replacing of electrodes. Fluid treatment rates slow, power consumption increases, and effluent quality degrades as electrodes scale and pit. The required handling and cleaning of passivated anodes and cathodes provides additional risk to operators.

Another problem with EC is that it typically is used in mid-range conductivity systems (as higher conductivity means faster passivation). Such systems require the electrodes to be closely spaced, such as 0.25" to 2" (for suitable current transfer), which means that upper limit flow rates are significantly limited. Conventional EC also consumes a large footprint, with heavy equipment. More power is also required in order to have adequate current transfer. Example conductivities include $5.5 \times 10^{-6}$ S/m (or less) for ultrapure water, 0.005-0.05 S/m for drinking water, and about 5 S/m for seawater.

Additional problems associated with EC pertain to the production of gases, such as O2 or H2, which need to be adequately contained and accounted for.

And yet even further problematic are the post-EC treatment processes. To sufficiently separate the floc ('floc and drop' or gravity separation) from treated water requires extensive time and space. The largest amount of equipment required in the entire process are typically tanks and separation equipment needed for this indispensable last step.

Any one of these detriments (let alone combinations) has left conventional EC not previously contemplated for successful use on offshore vessels or for high flow rate operations.

It therefore follows that there is a need for simple, energy-efficient and cost-effective process, system, and related units, for treating fluids, such as produced water, to produce a high-purity product. There is a need for a treated product that is suitable for environmentally safe disposal, reuse in an oil and gas production facility, as well as other uses such as industrial, medical, or agricultural.

There is a need for an improved offshore EC processes that have any of low operating costs, reduced capital costs, safe to use, compact footprint, and substantial or complete elimination of undesired passivation.

There is a need for an EC process readily usable with high-capacity flow rates. There is a need in the art for a liquid treatment process that does not require filtration media or chemical treatment and minimizes waste and its associated disposal and long-term liability challenges. There is a need in the art for equipment units that may be retrofitted or coupled with to any existing liquid treatment facility.

SUMMARY

Embodiments herein pertain to an electrocoagulation unit that may include one or more of: an outer shell, an inner housing which may be coupled with the outer shell; a set of electrodes disposed within the inner housing, each electrode being separated from an adjacent electrode by an electrode gap spacing. The outer shell may further include a fluid inlet; a fluid outlet; a first busbar opening; a and second busbar opening.

The unit may include a first pressure gland assembly sealingly coupled with the first busbar opening. The pressure gland may include a first gland power bar disposed within a first gland body. The unit may include a second pressure gland assembly sealingly coupled with the second busbar opening. The second pressure gland assembly may further include a second gland power bar disposed within a second gland body.

The unit may include a first busbar coupled with the first gland power bar. The first busbar may be coupled with every other electrode of the set of electrodes. The unit may include second busbar coupled with the second gland power bar. The second busbar may be coupled in an alternating manner with every electrode of the set of electrodes not coupled with the first busbar.

The unit may have a plurality (such as individual pieces) of sacrificial media disposed between each respective adjacent pair of electrodes.

An at least one electrode of the set of electrodes may have a (cumulative—front and back, etc.) surface area in a range of 1000 inches to 2000 inches. An at least one electrode of the set of electrodes may have an electrode thickness in a thickness range of 0.1 inches to 2.5 inches. The unit may have an electrode gap spacing between an at least two of the set of electrodes comprises a gap distance of 4 inches to 8 inches.

Any pieces of the sacrificial media may have perforations. In aspects, there may be set of perforations in a range of 3 perforations to 9 perforations. Any of the pieces may have a media thickness of the sacrificial media is in a range of 0.001 inches to 0.005 inches. Naturally these dimensions refer to the media prior to use.

Any of the bars may have a main bar body made of conductive metal. Any of the bars may have a surface coating. In embodiments, any of the bars may have a first surface portion coated with a dielectric material, and a second surface portion coated with a conductive material.

Any of the electrodes of the set of electrodes may have a main electrode body made of platinum. Any of the electrodes may have an outer electrode surface coating. The surface coating may be a noble metal. Similarly, any jumpers of the unit may be made of a conducting material. Any of the jumpers may have a first jumper surface portion coated with the dielectric material, and a second jumper surface portion coated with the conductive material.

Embodiments herein pertain to an electrocoagulation unit that may include one or more of: an outer shell (which may further have: a first busbar opening); an inner housing within the outer shell; a set of electrodes disposed within the inner housing, each electrode being separated from an adjacent electrode by an electrode gap spacing; a first pressure gland assembly sealingly coupled with the first busbar opening, the first pressure gland assembly further comprising a first gland power bar disposed within a first gland body; a first busbar coupled with the first gland power bar, and further coupled with every other electrode of the set of electrodes; and a plurality (such as individual pieces) of sacrificial media disposed between each respective adjacent pair of electrodes.

Still other embodiments herein pertain to an electrocoagulation system that may include an electrocoagulation unit operably associated with a powers source and a flotation vessel.

The electrocoagulation unit may include an outer shell, the outer shell further may have: a first busbar opening; an inner housing within the outer shell. There may be a set of electrodes disposed within the inner housing. Each of the electrodes may be separated from an adjacent electrode by an electrode gap spacing. There may be first pressure gland assembly sealingly coupled with the first busbar opening. The first pressure gland assembly may include a first gland power bar disposed within a first gland body. There may be a first busbar coupled with a first end of the first gland power bar, and further coupled with every other electrode of the set of electrodes. There may be a plurality of sacrificial media disposed between each respective adjacent pair of electrodes.

The system may include the electrocoagulation unit pressurized to an operating pressure in a range of about 50 psi to 160 psi. The unit may be operated at a flow rate in a range of 200 gpm to 500 gpm. The flow of fluid entering the electrocoagulation unit may have 1000 ppm to 5000 ppm total suspended solids (TSS).

The power source may be rectifier electrically coupled with a second end of the second gland power bar.

The power source may be operable to amps to the electrocoagulation unit in an amperage range of 300 amps to 500 amps. The power source may be operable to provide volts to the electrocoagulation unit in a voltage range of 1 volt to 20 volts.

The system may include the flotation unit operably associated with an injection system. The injection system may be operated to form an injection stream comprising bubbles having an average effective diameter in a range of 10 microns to 300 microns. The treated fluid may be received into the flotation vessel, and may mix with the injection stream.

Any of the electrodes may have a main electrode body made of platinum, and any of the electrodes may have outer electrode surface coating made of a metal material. The metal material may be or include a noble metal, such as ruthenium.

Any piece of the sacrificial media disposed into the electrocoagulation unit may include or be made of multivalent ion producing metal. Any piece disposed therein may have a media thickness is in a range of 0.001 inches to 0.005 inches.

Embodiments herein pertain to a method for removing contaminants from a fluid that may include one or more steps of: disposing an amount of a sacrificial media into an electrocoagulation unit; operating the electrocoagulation unit at a pressure above atmospheric; receiving the fluid into the electrocoagulation unit; providing power to the electrocoagulation unit from a power source to electrochemically treat the fluid to form a treated fluid with a floc comprising coagulated contaminants; transferring the treated fluid to a flotation vessel; removing at least some of the floc via flotation to form a secondary treated stream; removing other contaminants of the secondary treated stream with a compressible media filtration vessel to form a treated product.

Other embodiments herein pertain to method for removing contaminants from a contaminated water stream that may include one or more steps of: disposing a plurality of individual pieces of sacrificial media into an electrocoagulation unit; operating the electrocoagulation unit at a pressure in a range of 50 psi to 160 psi; transferring the contaminated water stream into the electrocoagulation unit; providing power to the electrocoagulation unit from a power source to electrochemically treat the contaminated water stream to form a treated water stream with a floc portion comprising coagulated contaminants; and transferring the treated water stream out of the electrocoagulation unit.

The electrocoagulation unit of the method and respective components may in accordance with embodiments herein. The flotation vessel of the method and respective components may be in accordance with embodiments herein.

Still other embodiments herein pertain to an electrocoagulation unit that may include one or more of: an outer shell comprising a first busbar opening; an inner housing within the outer shell; a set of 4 to 10 electrodes disposed within the inner housing, each electrode being separated from an adjacent electrode by an electrode gap spacing in a range of 5 inches to 7 inches; a first pressure gland assembly sealingly coupled with the first busbar opening, the first pressure gland assembly further comprising a first gland power bar disposed within a first gland body; a first busbar coupled with the first gland power bar, and further coupled with every other electrode of the set of electrodes; and a plurality of sacrificial media disposed between each respective adjacent pair of electrodes.

In still yet other embodiments an electrocoagulation treatment system may include an electrocoagulation unit electrically coupled with a power source.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein:

FIG. 6A shows an isometric view of a pressure gland assembly according to embodiments of the disclosure;

FIG. 6B shows a partial side cross-sectional component breakout view of a pressure gland assembly associated with an EC unit and a spool piece according to embodiments of the disclosure;

FIG. 6C shows a partial side cross-sectional assembled view of the components of FIG. 6B;

FIG. 8B shows a partial internal side view of a compressed media vessel of a filtration skid according to embodiments of the disclosure;

FIG. 9C shows a partial-cut overhead view of a vessel like that of FIG. 9A according to embodiments of the disclosure;

DETAILED DESCRIPTION

Figure 1:
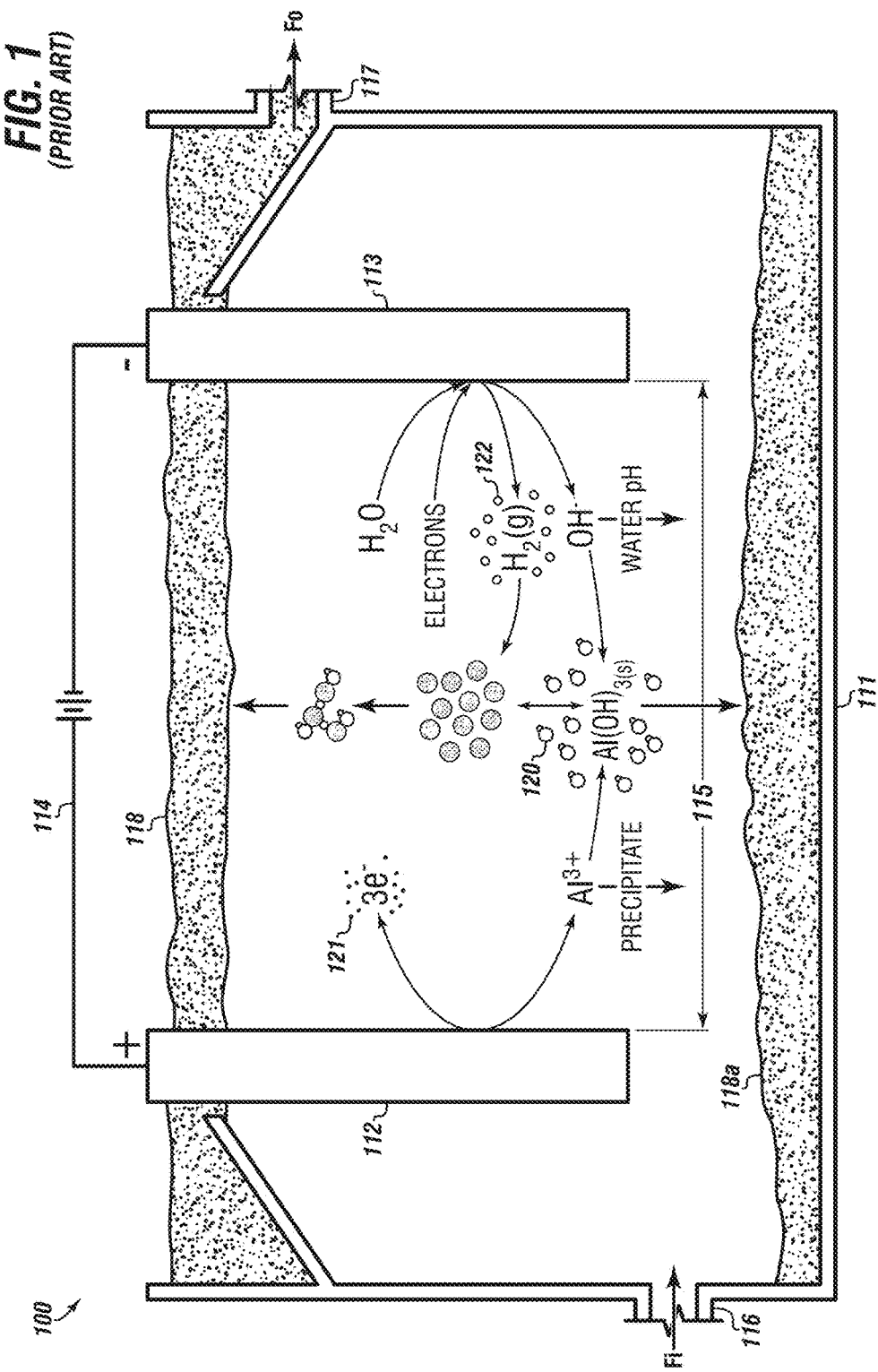
FIG. 1 shows an overview process diagram of a conventional EC process.

Herein disclosed are novel apparatuses, units, systems, and methods that pertain to improved fluid treatment and aspects related thereto, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Various equipment may be in fluid communication directly or indirectly with other equipment. Fluid communication may occur via one or more transfer lines and respective connectors, couplings, valving, and so forth. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000. it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

Terms

The term "connected" as used herein may refer to a connection between a respective component (or subcomponent) and another component (or another subcomponent), which can be fixed, movable, direct, indirect, and analogous to engaged, coupled, disposed, etc., and can be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "fluid" as used herein may refer to a liquid, gas, slurry, multi-phase, etc. and is not limited to any particular type of fluid such as hydrocarbons.

The term "fluid connection", "fluid communication," "fluidly communicable," and the like, as used herein may refer to two or more components, systems, etc. being coupled whereby fluid from one may flow or otherwise be transferrable to the other. The coupling may be direct or indirect. For example, valves, flow meters, pumps, mixing tanks, holding tanks, tubulars, separation systems, and the like may be disposed between two or more components that are in fluid communication.

The term "pipe", "conduit", "line" or the like as used herein may refer to any fluid transmission means, and may be tubular in nature.

The term "composition" or "composition of matter" as used herein may refer to one or more ingredients, components, constituents, etc. that make up a material (or material of construction). Composition may refer to a flow stream of one or more chemical components.

The term "chemical" as used herein may analogously mean or be interchangeable to material, chemical material, ingredient, component, chemical component, element, substance, compound, chemical compound, molecule(s), constituent, and so forth and vice versa. Any 'chemical' discussed in the present disclosure need not refer to a 100% pure chemical. For example, although 'water' may be thought of as H2O, one of skill would appreciate various ions, salts, minerals, impurities, and other substances (including at the ppb level) may be present in 'water'. A chemical may include all isomeric forms and vice versa (for example, "hexane", includes all isomers of hexane individually or collectively).

The term "water" as used herein may refer to a pure, substantially pure, and impure water-based stream, and may include waste water, process water, fresh water, seawater, produced water, slop water, treated variations thereof, mixes thereof, etc., and may further include impurities, dissolved solids, ions, salts, minerals, and so forth. Water for a frac fluid can also be referred to as 'frac water'.

The term "frac fluid" as used herein may refer to a fluid injected into a well as part of a frac operation. Frac fluid is often characterized as being largely water, but with other constituents such as proppant, friction reducers, and other additives or compounds.

The term "produced water" as used herein may refer to water recovered from a subterranean formation or other area near the wellbore. Produced water may include flowback water, brine, salt water, or formation water. Produced water may include water having dissolved and/or free organic materials. Produced water may refer to water from non-wellbore related processes, such as potable water treatment, sewage treatment, and equipment and building maintenance.

The term "electrochemical" as used herein may refer to generating electrical energy from a chemical reaction(s) or using electrical energy to cause a chemical reaction(s). An example electrochemical process may include electrocoagulation.

The term "electrocoagulation" (or "EC") as used herein may refer to an electrochemical process that results in coagulation of a desired component(s) from a fluid, such coagulating an organic in the presence of water.

The term "conductivity" or "electrical conductivity" as used herein may refer to a measure or quantification of a material's ability to conduct (or pass, transfer, transmit, etc.) an electric current. The higher the value, the greater the ability to conduct.

The term "salt" as used herein may refer to an ionic compound. A salt can be electrically neutral (i.e., no net charge).

The term "polymeric", "polymer-based", and the like may refer to a chemical (or material thereof) made of a polymer. "Polymeric-based" as used herein may refer to a chemical or chemical blend (or material thereof) that includes or has a polymeric constituent as part of its compositional makeup.

The term "treatment" (or treating, treated, treat, etc.) as used herein can refer to an action such as purifying, separating, charging, heating, drying, cleaning, and so forth. One example may include 'treating' a multi-phase fluid to separate phases. Another example may include 'treating' a substantially aqueous (water) stream to remove a non-aqueous component.

The term "impurity" as used herein may refer to an undesired component, contaminant, etc. of a composition. For example, a hydrocarbon or organic component may be an impurity of a water stream.

The term "passivation" as used herein may refer to the scaling, oxidation, and pitting of an anode and/or a cathode during EC. Passivation is known to be driven by a fluid's scaling potential and Total Dissolved Solids (TDS) concentration, and may occur rapidly upon initiation of EC.

The term "skid" as used herein may refer to one or more pieces of equipment operable together for a particular purpose. For example, an 'EC skid' may refer to one or more pieces of equipment operable to provide or facilitate an EC process. A skid may be mobile, portable, or fixed. Although 'skid' may refer to a modular arrangement of equipment, as used herein may be mentioned merely for a matter of brevity and simple reference, with no limitation meant. Thus, skid may be comparable or analogous to zone, system, subsystem, and so forth.

The term "skid mounted" as used herein may refer to one or more pieces operable together for a particular purpose that may be associated with a frame- or skid-type structure. Such a structure may be portable or fixed.

The term "engine" as used herein may refer to a machine with moving parts that converts power into motion, such as rotary motion. The engine may be powered by a source, such as internal combustion.

The term "motor" as used herein may be analogous to engine. The motor may be powered by a source, such as electricity, pneumatic, or hydraulic.

The term "drive" (or drive shaft) as used herein may refer to a mechanism that controls or imparts rotation of a motor(s) or engine(s).

The term "pump" as used herein may refer to a mechanical device suitable to use an action such as suction or pressure to raise or move liquids, compress gases, and so forth. 'Pump' can further refer to or include all necessary subcomponents operable together, such as impeller (or vanes, etc.), housing, drive shaft, bearings, etc. Although not always the case, 'pump' can further include reference to a driver, such as an engine and drive shaft. Types of pumps include gas powered, hydraulic, pneumatic, and electrical.

The term "frac operation" as used herein may refer to fractionation of a downhole well that has already been drilled. 'Frac operation' can also be referred to and interchangeable with the terms fractionation, hydrofracturing, hydrofracking, fracking, fracing, and frac. A frac operation can be land or water based.

The term "offshore" as used herein may refer to an above-surface (but on water), as well as subsea, environment. Vessels suitable for working offshore may include a Floating Production Storage and Offloading (FPSO) and a Floating Storage and Offloading (FSO), each known for being involved in production, receiving, transporting, storage, and offloading of hydrocarbonaceous materials. An offshore vessel may include a platform or structure fixed or floating over water. Other examples include Tension Leg Platform (TLP) SPAR, Shallow Water Complex, Gravity Base System (GBS) or Compliant Towers.

The term "utility fluid" as used herein may refer to a fluid used in connection with the operation of a heat generating device, such as a lubricant or water. The utility fluid may be for heating, cooling, lubricating, or other type of utility. 'Utility fluid' can also be referred to and interchangeable with 'service fluid' or comparable.

The term "mounted" as used herein may refer to a connection between a respective component (or subcomponent) and another component (or another subcomponent), which can be fixed, movable, direct, indirect, and analogous to engaged, coupled, disposed, etc., and can be by screw, nut/bolt, weld, and so forth.

The term "porosity" as used here may refer to the ratio, sometimes expressed as a percentage, of the void spaces, or interstices, of filtration media to the total volume of the filtration media.

The term "collector size" as used herein may refer the average effective diameter or spacing pores of the filtration media. The collector size and the porosity values may be modified may adjusting size of an associated compression chamber.

Any surface of (sub)components described herein may have a coating, a surface coating, etc. The coating may be applied or otherwise formed in any suitable manner over an inner body, such as by spraying, shrinking, heat, plating, sintering, and so forth. Coatings may vary. For example, any surface of a conductive component, such as a metallic or alloy bar, exposed to a liquid may be coated with a dielectric or other type of non-conducting material, such as Plastisol. Just the same, any surface of the same or other conductive component that may be coupled with another component (e.g., a metal-to-metal connection) may be coated with a conducting (including highly-conducting) material, such as platinum. In this respect some surfaces may have a dual coating, such as one portion of a coating that is non-conductive, and another portion of the coating this is conductive. Moreover, fastening devices may be coated and/or multi-coated in the same manner.

While the thickness of any respective coating along a particular component may vary, embodiments herein may include a generally uniform surface coating thickness. The thickness may be about 5 mils to about 50 mils (a mil being equal to 0.001"). In embodiments, the thickness may be about 20 mils to about 40 mils.

Figure 2:
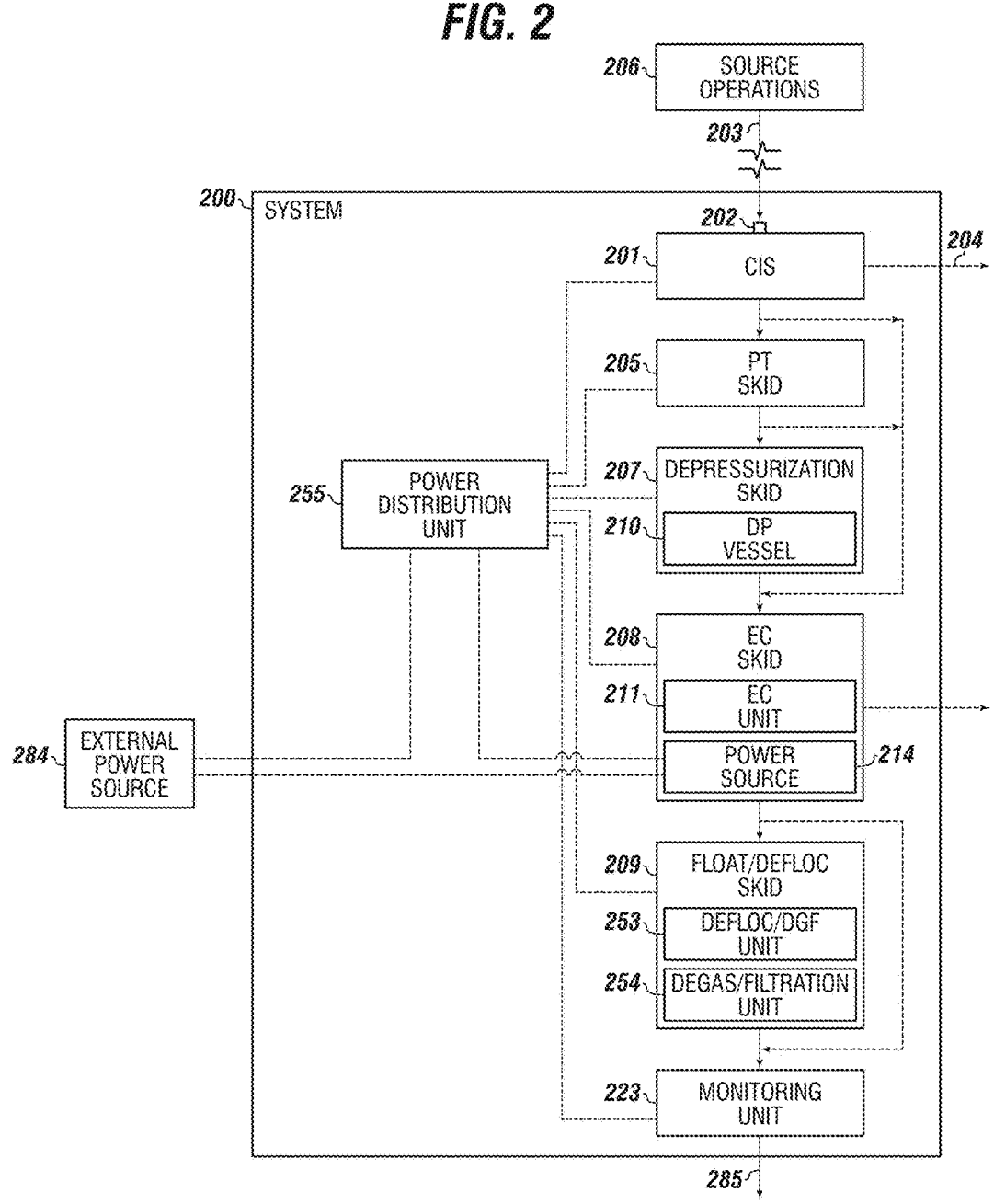
FIG. 2 shows an overview process diagram of a fluid treatment system using EC according to embodiments of the disclosure.

Referring now to FIG. 2, an overview process diagram of a fluid treatment system using EC, in accordance with embodiments disclosed herein, is shown. Fluid treatment system 200 may include one or more components (or subcomponents) coupled with existing equipment. System 200 may be skid mounted or may be a collection of skid units. System 200 may be suitable for onshore and offshore environments.

System 200 may include a customer interface system (CIS) 201. The CIS 201 may be configured to interface or couple with a unit, operation, system, etc. whereby an incoming fluid from a source operation 206 may be fed to the CIS 201, such as via a connecting between source operation feedline 203 to CIS inlet 202. The source operation 206 may generally be any operation from which a source fluid may be received by the system 200 for treatment thereof. The source operation 206 may occur on or be associated with an offshore vessel, such as an FPSO.

Although not shown here, the CIS 201 may have various valves, flanges, pipes, pumps, utilities, monitors, sensors, controllers, flow meters, safety devices, etc., for accommodating sufficient universal coupling between the system 200 and any applicable feedline/feed source of a fluid to be treated from a source operation 206. The CIS 201 may be in fluid communication with a wellbore, wellhead, operating system, production system, tank etc. associated with the source operation 206. The source of fluid may also be a natural or free-standing source, such as a pond (natural or manmade), a lagoon, lake, river, etc. The CIS 201 may have a monitor operable to ensure the fluid stream is suitable for the system 200. The CIS 201 may have a return or bypass line 204 for in the event the fluid stream may be deemed unsuitable, and thus the fluid stream may be transferred elsewhere from the system 200.

Provided the fluid meets predetermined specification, the fluid may pass to a pretreatment (PT) skid 205. The pretreatment skid 205 may include one or more units for treating a single- or multi-phase fluid. In embodiments, the pretreatment skid 205 may include a separator operable to treat a 2-, 3-, or 4-phase fluid. For example, the fluid may be a water-based stream with an organic phase, as well as solids (including suspended, dissolved, etc.) and gases, that may be treated to separation via PT skid 205.

PT skid 205, which may include chemical injection, may be used to remove large and/or easily separable components, such as bulk solids and free oil. The separated components may be returned to source operation 206, recycled, disposed of, or otherwise transferred from the skid 205 (or system 200) as desired.

PT skid 205 may include one or more separators configured with a screen or other suitable device, an agitator (mixer), one or more injection ports, and so forth. When PT skid 205 includes a mixer, the mixer may be operable to not only mix but also to separate out a side stream of separated contaminants.

In embodiments, the PT skid 205 may include a hydrocyclone or cyclonic separator, which may be suitable to both mix and separate out a discontinuous phase from a continuous phase liquid. For example, in such a device, heavy components such as solids may be shunted to the outside of the continuous flow stream for collection. Similarly, light components, such as an aliphatic organic stream, may readily coalesce in the center of the continuous flow stream.

Other components suitable for the PT skid 205 may include, but need not be limited to, coalescers (or coalescing systems such as beds), chemical injectors, medial filtrations devices, API oil separators, and the like, including by way of example a Voraxial-type separator provided by Enviro Voraxial Technology, Inc.

As the source operation 206 may vary, it may be desirous for system 200 to include or accommodate capability for suitable pressure control. Thus, the PT skid 205 may include depressurization capability, which may aid or facilitate separation. In addition, or in the alternative, the system 200 may include a depressurization (DP) skid 207.

Although depressurization may occur at any point within system 200, FIG. 2 illustrates pretreated fluid may be transferred from the PT skid 205 to the DP skid 207. The system 200 may include degasification and depressurization prior to fluid being transferred to the EC skid 208. Just the same, the DP skid 207 may be bypassed or not used at all. This may be the case when an EC skid 208 operates under pressure, where depressurization may occur further downstream, such as in a post-treatment skid 209.

The DP skid 207 may include one or more units operable to control the flow rate and pressure of a fluid received therein. In embodiments the fluid may be transferred directly to skid 207 from the source operation 206. In aspects, the DP skid 207 may include a depressurization vessel 210 configured to vent to ambient conditions or to process flare. The depressurization vessel 210 may be configured with an inlet and outlet with either manual or automated control.

The depressurization vessel 210 may have a conical bottom, which may be suitable to divert solids that may freely settle to the bottom of the vessel 210. The DP skid 207 may have one or more depressurization vessels 210 arranged in parallel, series, or as otherwise may be desired. The depressurization vessels 210 need not be the same.

The pressure of fluid from the PT skid 205 and/or depressurization skid 207 may be anywhere in the range of about 5 psi to about 225 psi. Fluid from any of source 206, skid 205, skid 207, etc. may be fed to EC skid 208, which may include an operable (sub)system employing an EC process to promote electrolytic oxidation, emulsion destabilization, and flocculation. The EC skid 208 may utilize subject matter of U.S. Pat. No. 8,431,010, which is incorporated herein by reference in its entirety for all purposes, and particularly as it pertains to EC.

The EC skid 208 may include one or more EC reactor units 211, which may be operable in series, parallel, or as otherwise desired. Although not limited to any particular pressure/pressure range, any of the EC reactor unit(s) 211 may be a vessel operable to maintain pressure in a pressure range of about 0 (atmospheric) to about 225 psi. The EC skid 208 may also be suitable for the destruction of pathogens, viruses, bacteria, and removes them from the fluid along with other impurities and contaminants.

A key aspect of the EC skid 208 is the substantial reduction or outright elimination of passivation of powered electrodes by way of introduction of a sacrificial electrode or media. The EC reactor unit 211 may have one or more electrodes made of a durable metal, such as aluminum, titanium, silver, copper, gold, zinc, nickel, brass, iron, platinum, seal, lead, stainless steel, pure or alloys thereof, and so forth. The EC reactor unit 211 may be configured with one or more sets of electrodes (e.g., cathode and anode—not shown here) that may be alternately connected to a respective positive and negative portion of a current source 214.

With respect to the sacrificial media (not viewable here), this may be one or more pieces formed of multivalent ion producing metal such as iron, zinc, magnesium, copper, aluminum, and so forth. The sacrificial media may be bipolar. The sacrificial media may be used in solid, shredded, powdered, or slurry form, and thus may be contemplated as having any shape suitable for facilitating EC within the unit 211. Non-limiting examples include oval, cylindrical, zig, zag, wavy, curvy, etc., and combinations thereof. Other shapes include woven metal cloth, mesh, woven metal pads, and planar and/or non-planar strips.

By using the sacrificial media, the need for removal and cleaning of scale and other surface contaminants from the electrodes is greatly mitigated and, in some instances, even eliminated. This may provide for a dramatic increase in uptime (or rather a decrease in "downtime") with the corresponding decrease in operating costs. Because the sacrificial media may be completely consumed, there is no solid waste produced that requires additional handling and attention (such as is the case with spent filtration medias, the storage and disposal of which can be problematic on an off-shore oil and gas facility).

The sacrificial media (or any piece thereof) may have a thickness in a range from about 0.1 inches to about 0.001 inches. The sacrificial media may be filled or otherwise disposed into a 'cell' region in the unit 211 proximately between a respective cathode and anode. The initial fill of sacrificial media may be about 50% to about 75% of a respective cell region volume. In embodiments, each cell region may initially be filled to about 50% to about 75% by volume.

By positioning the sacrificial media between electrodes, the electrodes may be spaced much further apart as compared to that of traditional EC. In embodiments, a set of a cathode and a respective anode may have an associated separation gap distance in a range of about 3" to about 12". In other embodiments, the range may be about 5" to about 7".

It has been surprisingly discovered that this wide gap distance may advantageously promote use of the EC unit 211 in high capacity flow rate operations, yet at the same time not require excessive power. It is believed the sacrificial media fluidized between the electrodes functions to reduce resistance across the fluid being treated. In this respect, the sacrificial media acts as a pseudo-conductivity bridge between electrodes. This property may further mitigate, or even eliminate, the need for chemical additives during the EC process, and further promotes treatment ability of very low-conductivity waters with minimal power. The sacrificial media may be fluidized, in constant motion, continually changing polarity, and may be further associated with anode/cathode spacing vastly increased over that of traditional EC treatment systems.

This conductivity bridge is a critical difference to any other EC process. By engineering an effective 'bridge', the EC process of system 200 now becomes a true commercial offering for limited space, high volume applications where uptime is critical.

The EC reactor unit 211 may have inlet for receiving the fluid to be treated, and an outlet for the transfer of treated fluid therefrom. The flow of the fluid through the EC unit 211 in combination with the sacrificial media may be continuous, and may result in an effective fluidized bed where the EC process occurs. 'Continuous' flow through system 200 may refer to the circumstance where a requisite amount of sacrificial media has been consumed sufficiently to the point that additional media may need to be added to the unit 211, but further recognizing that utilizing one or more skids, trains, etc. promotes the ability to switch flow to another unit 211, and thus keep the process continuous.

Flow rates through the EC unit 211 may be in the range of about 1 gpm to about 1000 gpm (or even greater as multiple units 211 may be utilized). Embodiments herein readily facilitate treating upwards of 35,000 BPD of contaminated fluid, including for offshore, at reduced weight and reduced manhours compared to that of conventional treatment systems.

Treated fluid from an outlet of the EC skid 208 may be directed to a storage tank or other operation, such as a post-EC treatment skid, whereby solids, floc, and other undesirables may be removed. For example, the resultant floc fluid, which may have coagulated contaminant therewith, may be transferred to post-treatment, such as a multi-stage floatation/defloc skid 209. Chemical injection may be used in transfer between EC skid 208 to skid 209. A suitable chemical for injection may be that which provides stability to the floc so that it does not readily disassociate. A stabilizing chemical may be one that provides additional stability to the bonds (e.g., ionic) within the floc.

To aid against passivation, the electrodes may be covered or coated with an outer surface material, which may be metallic. The outer surface material may be a substantially pure noble metal, such as ruthenium. Other metals may include rhodium, palladium, silver, osmium, iridium, platinum, gold, and so forth. Also alloys of these with other metals and/or metal oxides may be used as the outer surface coating, such as iridium oxide, titanium oxide, and ruthenium oxide may be employed with the systems of the application. The electrode coating utilized may depend on the treatment goal, for example, if the goal is the production of chlorine dioxide for bacterial control, different electrode coatings may be selected.

It may be desirous to "flip" or reverse the polarity of the electrodes of the EC unit 211. By shifting the polarity, this may prevent or at least mitigate the accumulation of contaminants that selectively travel in one direction within an electrical field. Switching polarity also prevents the buildup scale on electrode faces and maintains the 'bi-polar' functionality of the sacrificial electrodes The post-EC treatment skid 209 may include separate or joined flotation and filtration capability, but need not require both. In some embodiments, the flotation/dissolved gas filtration (DGF) unit 253 and the media filtration 254 unit may be separate. The DGF unit 253 may have a single flotation zone. In other embodiments treatment skid 209 may include a combined flotation and media filtration unit (for which the media may be regenerable). In this respect, treated fluid from the EC skid 208 may enter the unit via a first inlet, and pass through one or more floatation zones.

The zones, if more than one, may be separated by respective flow diverters, baffles, and so forth. Gasses and some solids or phase separated non-aqueous fluids, to any extent present, may be collected or skimmed at the top of the inlet zone. Any of the zones may have gas, gas bubbles, microbubbles, and combinations thereof introduced (injected) therein. For example, gas and liquid may be fed to a high-shear mixer, dispersion pump, or the like, for forming a bubble-based mixture that may then be injected into the DGF unit 253. Injection may occur in the inlet (just prior to vessel entry), from the bottom, side, or as otherwise desired. Injection may occur via one or more injection nozzles, which may be oriented at an angle or parallel with respect to a reference axis.

The bubbles may be microbubbles (i.e., bubbles having an average bulk diameter in micron size). Bubbles may be useful to provide buoyancy, and thus push and/or float contaminates, oil, floc, and the like to the surface for removal, usually by skimming (skimmer not shown) or collection in a weir or bucket for transfer via pump or pressure. For synergy, bubbles may be created by using gas generated in the EC unit 211 to the skid 209 (and DGF unit 253).

This floatation effect may be repeated in any subsequent zones. In the last zone, there may be an outlet in fluid communication with a media filtration zone, whereby the fluid may be transferred thereinto. The filtration zone may include compression plates, and regenerable filtration media (not shown) therebetween. The filtration media may be suitable to effectively filter the concentration of organics and other undesirable contaminants. The filtration media may be a compressible media. Upon passing through the filtration media, the treated fluid may exit the filtration unit via an outlet.

When in use, the filtration media may be in a compressed state. Upon saturation, the media may be regenerated by de-compressing the media with the released contaminants being collected for separate disposal. This may be accomplished by back flushing with clean water, a cleaning fluid, or compressed gas such as fuel gas.

As the porosity of the compressed media diminishes, the need for regeneration increases. However, the processes of decompressing and back-flushing may allow the media to release all or nearly all of the materials mechanically trapped therein. In embodiments there may be a porosity gradient through the compressed media. The gradient may be the result of where compression begins—more compression where compression starts, less compression elsewhere. In embodiments the porosity gradient may increase against (or be opposite to) the direction of fluid flow (or put another way, may decrease with flow). The effective pore size of the media may be adjusted according to properties of the fluid entering the vessel. Fluid may flow through the media encountering progressively more compressed media (with a smaller effective pore size), to removal of smaller and smaller contaminants. With that said, embodiments herein may pertain to fluid flow with the gradient increase.

This is step change from conventional EC, which does not utilize filtration—conventional EC utilizes a gravity separation or a 'floc and drop' concept without care about time. Moreover, filtration used offshore tends to be filter media, which becomes permanently saturated with contaminants and cannot be regenerated. This issue is very important in operations such as offshore oil and gas facilities where waste or storage space is extraordinarily scarce, and waste such as spent filter cartridges or bulk media must instead be transported to shore and then subjected to disposal as a waste or hazardous waste.

The treatment skid 209 may be operable with one or more units in parallel, series, or otherwise as desired. Operating in series may provide for differential filtering whereby the amount of compression may be varied to control the size of particles that may pass through the filter media. In an embodiment, the media in a first media filter unit may be compressed such that comparatively large particles may be caught, and fine particles may be passed through to a second media filter unit, whereby the media is further compressed to catch the fine particles.

Fluid exiting the treatment skid 209 may be passed through a monitoring unit 223, which may include a controller operable with one or more (sub)systems to determine fluid quality. Treated fluid (or system product) 285 may be readily discharged or transferred from the system 200.

If the fluid quality leaving the system 200 is within a preset specification, the now treated fluid 285 may be disposed, such as via pump or gravity, through a discharge line (such as discharging overboard). Fluid that does not meet spec may be recycled through the system 200, such as via a recycle header, and back to any portion of system 200.

The system 200 may include a power distribution unit (PDU) 255 that may be operable and coupled in a manner to provide power to every equipment, skid, component, subsystem, etc. of system 200 (power leads not shown for brevity). The PDU 255 may be standalone, or may be able to interface with a source power unit 284. The system 200 may include capability to provide one or more of power conversion, power control and/or power management.

Controlling power and/or energy may be important in both for maintaining quality as well as managing energy expenditures related to system 200 and embodiments disclosed herein. In some embodiments, power may be controlled using at least one property of at least one of the feed fluid, in system fluid, and effluent fluid.

Power for the systems of the disclosure may come from any suitable source. For example, the source power unit may be a commercial electric service provider or in other embodiments, it may be from a customer's master control center (MCC), solar array, battery bank and generator set capable of providing for at least critical loads. The PDU 255 may have various components, such as a fan, DC power converter, PC power and site controller, transformers, container lights, electric pump, fuel pump, fire extinguishing system, AC unit, automation system, safety system control, interface with source control and safety system, sensor surveillance and camera system and components for communication.

The PDU 255 may be operable to monitor loads the system 200 and auto-manage multiple energy sources. The PDU 255 may be equipped with controls that regulate the distribution of power sources relative to the critical or non-critical nature of the loads and the system 200. Loads of the system 200 may include any piece of equipment, associated lighting, or other devices not described, but otherwise apparent to one of skill in the art.

The PDU 255 may also be used to control operational aspects of the system 200. For example, in one embodiment, the system 200 may employ one or more sensors capable of measuring pH, oxidation-reduction potential (ORP), LEL, temperature, and conductivity. By using these components, the system 200 itself may be regulated to operate with more efficiency. For example, less voltage (or more importantly, less power) may be employed in applications where the fluids being treated have relatively higher conductivity. In another example, pH can be monitored to mitigate the use of chemical additives, and in yet another embodiment, ORP may be monitored to optimize consumption of electrodes and/or the sacrificial media.

In some embodiments, the system 200 may include an oil and grease sensor. In still other embodiments, this sensor may be employed to optimize operation of the system.

Figure 3:
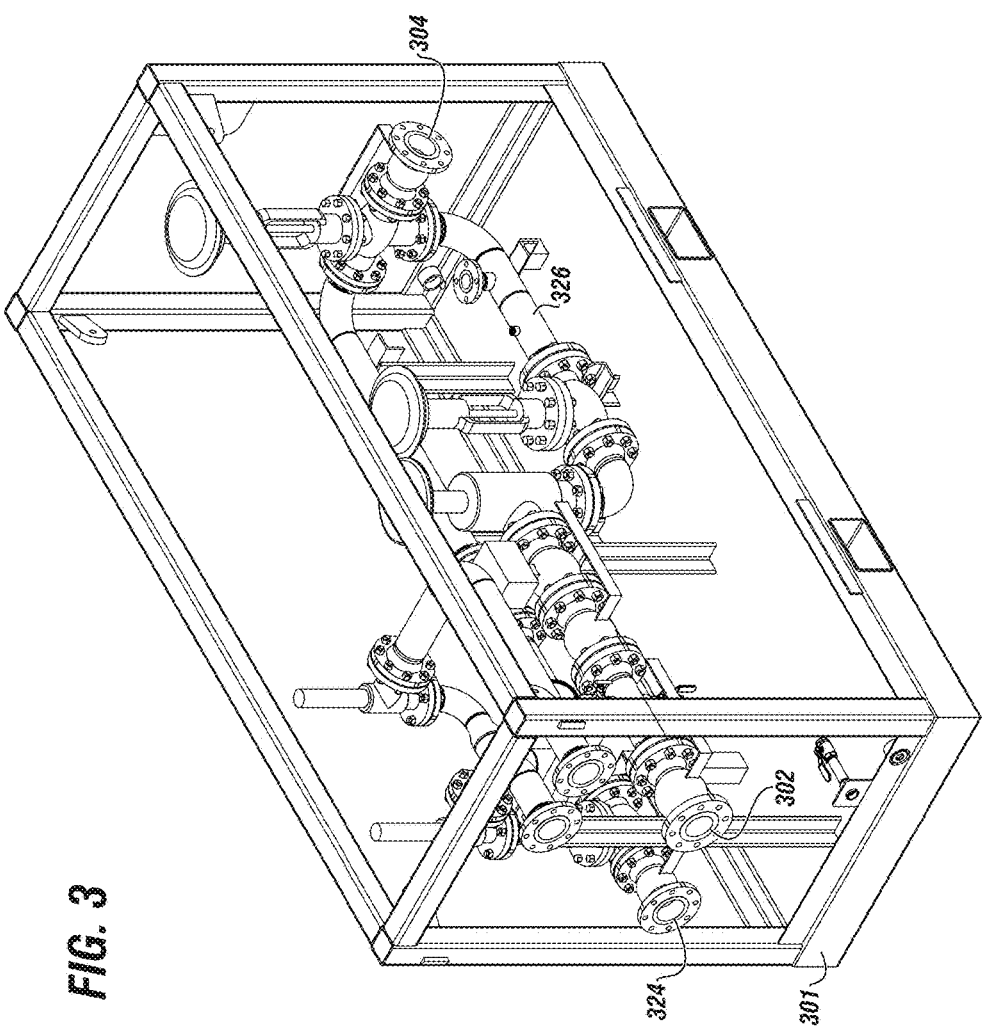
FIG. 3 shows an isometric view of customer interface system according to embodiments of the disclosure.

Referring now to FIG. 3, an isometric view of customer interface system, in accordance with embodiments disclosed herein, is shown. FIG. 3 illustrates a customer interface system (CIS) 301 usable with system and process embodiments described herein.

Embodiments herein apply to a CIS that may be an inclusive assembly of a number of components, subcomponents, which may be further associated with operable systems, subsystems, assemblies, modules, skids, and so forth, including those described herein. While CIS 301 may be shown as a 'skid' for simplicity, components of the CIS 301 need not be skid mounted. The CIS 301 may be part of an overall treatment system, such as system 200. While it need not be exactly the same, CIS 301 may include various features and components like that of other systems or units described herein, and thus components thereof may be duplicate or analogous.

The CIS 301 may be configured to interface or couple with a unit, operation, system, etc. whereby an incoming fluid from a source or source operation (not shown here) may be fed to the CIS 301, such as via a connecting between feedline (e.g., 203, FIG. 2) and a CIS inlet 302. The CIS 301 may provide desired pressure and flow control into the treatment system (200). The source operation may occur on or be associated with an offshore vessel, such as an FPSO. Of significance, the CIS 301 may be configured to provide shutoff or disconnect ability to the system (200).

The CIS 301 may have various valves, flanges, pipes, pumps, utilities, monitors, sensors, controllers, safety devices (such as pressure safety valves (PSVs), isolation valves, shutdown valves, flow control valves, pressure gauges, and so forth), chokes or pressure reducer valves, flow meters, etc., for sufficient universal coupling to any applicable feedline/feed source of a fluid to be treated from a source operation. The CIS 301 may be in fluid communication with a wellbore, wellhead, tank, pipeline, subsea flowline, etc. associated with the source operation. The CIS 301 may have a monitor operable to ensure the fluid stream is suitable for system treatment. The CIS 301 may have a return or bypass line 304 for in the event the fluid stream may be deemed unsuitable, and thus the fluid stream transferred elsewhere.

The CIS may include fluid analyzer (such as an oil and water analyzer) 326. The analyzer 326 may be operably associated with a valve whereby if a predetermined threshold or specification is not met, fluid may be bypassed or prevented from entering the treatment system. The CIS 301 may thus be configured to control (or de-rate) flow, or otherwise export data to a control system for the same. In this respect the CIS 301 provides a fluid quality control check for the system (200), as well as track historical data.

Fluid coming into the CIS 301 may have an initial pressure of about 50 psi to about 2200 psi. In embodiments the initial pressure may be in the range of about 80 psi to about 450 psi. Fluid coming into the CIS 301 may have an initial temperature of about 50° F. to about 175° F. Generally, the fluid coming into the CIS 301 may be predominantly liquidious. Although not meant to be limited, the fluid may be in the range of about 90% to about 100% by weight liquid phase. The fluid coming into the CIS 301 may have a high degree of solids, such as 2000 to 3000 ppm TSS, but in some instances even upwards of 2% TSS (or 20,000 ppm TSS). With a higher solids content, the flow rate may be reduced.

Fluid deemed suitable for treatment may be transferred from the CIS 301 downstream via outlet 324. In embodiments, fluid may be transferred from the CIS 301 to a pre-treatment skid, depressurization skid, EC skid, or other operations of the fluid treatment systems described herein. In this respect fluid introduced into the system (200) need not go through the CIS.

Figure 4A:
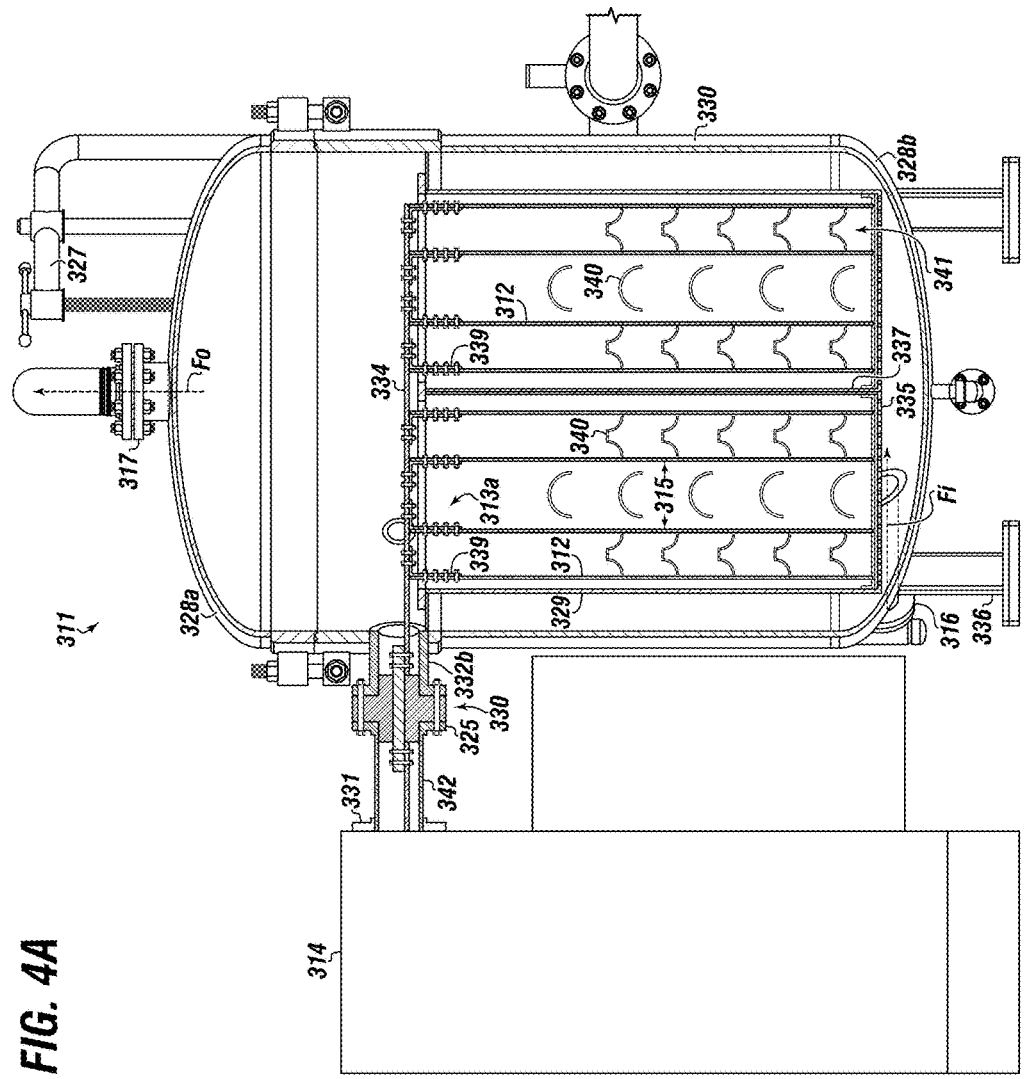
FIG. 4A shows an isometric view of an EC unit with an inner housing according to embodiments of the disclosure.
Figure 4B:
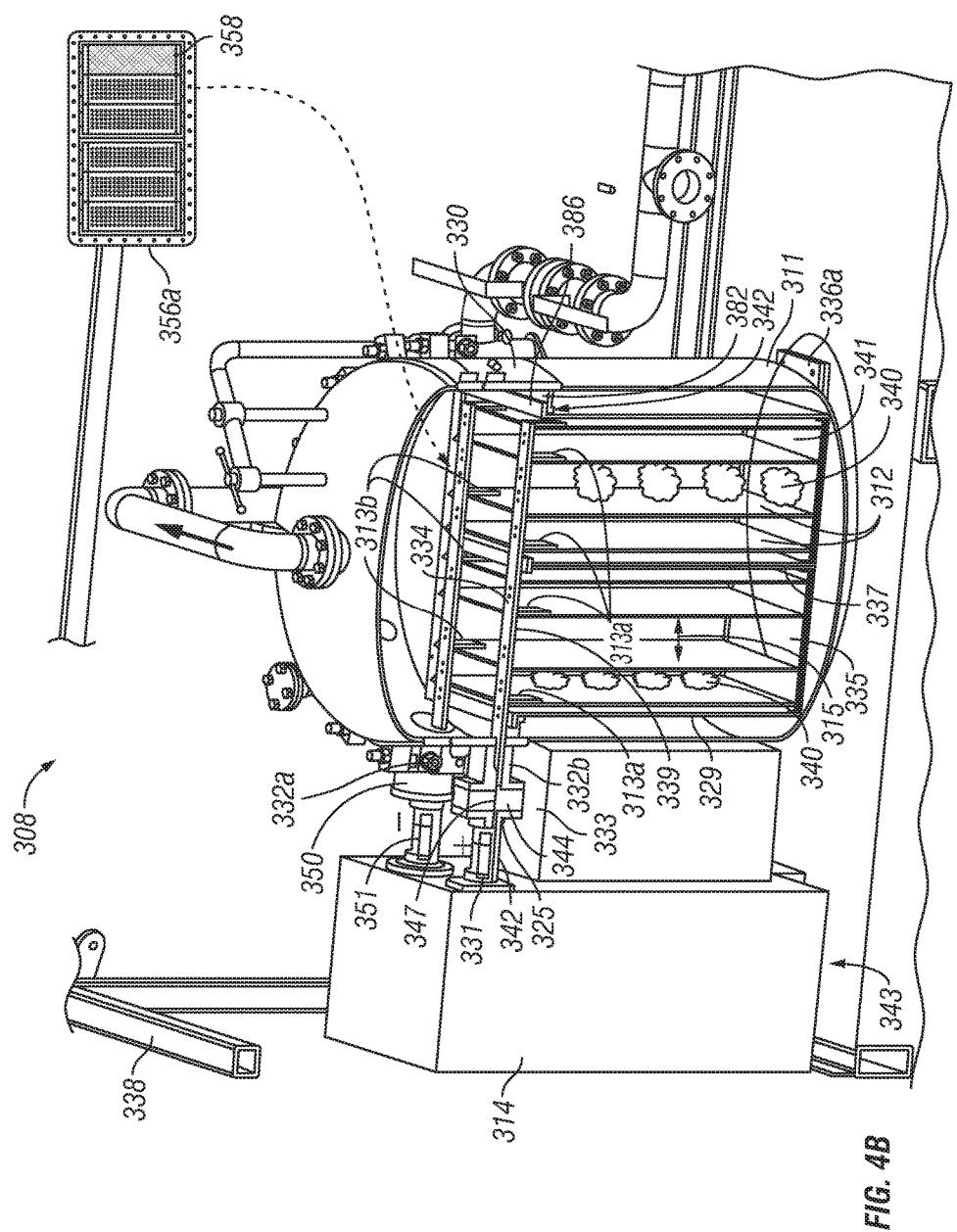
FIG. 4B shows a side view of an EC unit (shown with partial cut-away) coupled with a rectifier according to embodiments of the disclosure.

Referring now to FIGS. 4A and 4B together, a side cross-sectional view of an EC unit coupled with a rectifier, and an isometric view of an EC unit with an inner housing, respectively, in accordance with embodiments disclosed herein, are shown.

FIGS. 4A and 4B together illustrate an EC unit 311 usable with system and process embodiments described herein. The EC unit 311 (and rectifier 314) may be part of an overall EC skid 308. Embodiments herein apply to the EC skid 308 that may be an inclusive assembly of a number of components, subcomponents, etc. which may be further associated with operable systems, subsystems, assemblies, modules, skids and so forth, including those described herein. In embodiments there may be a single or a plurality of EC units 311 and associated rectifiers 314. The skid 308 may be operable in series, parallel, or as may otherwise be desired.

The EC unit 311 may be mounted to a frame-type structure 338 via one or more legs 336 or support mounts 336*a*. As shown in FIG. 4B, the EC unit 311 may be mounted to or otherwise positioned on a flooring 343. It is noted that while the EC unit 311 may be referred to as part of a 'skid' for simplicity, components of the EC skid 308 need not be skid mounted. The EC unit 311 may be part of an overall treatment system, such as system 200. While it need not be exactly the same, EC skid 308 may include various features and components like that of other systems or units described herein, and thus components thereof may be duplicate or analogous.

The EC unit 311 may be configured to interface or couple with a unit, operation, system, etc. whereby an incoming fluid from, for example, a source operation, a pre-treatment vessel or skid, or a CIS (301, FIG. 3) may be received. Fluid F, may be received into the EC unit 311 via an inlet 316, and upon treatment, may leave the EC unit via an outlet 317 as a 'treated fluid' $F_o$. While shown as side in, top out configuration, other fluid entry/egress points are possible, such as on the bottom and/or sides of the unit 311.

One of skill in the art would readily appreciate that typical EC occurs in an open or atmospheric system, and as such unit 311 may be operable comparably thereto. However, the EC unit 311 may be configured tantamount to an ANSI pressure vessel, which is to say the EC unit 311 may be run under pressure. The EC 311 unit may comfortably operate in pressure ranges from 0 psi to 225 psi. In embodiments the operating pressure of the EC unit 311 may be about 50 psi to about 160 psi. The EC unit 311 outer shell 330 may be made of a durable material, such as stainless steel, carbon steel, fiber glass, etc.

A key aspect of the EC skid 308 is the substantial reduction or outright elimination of passivation of powered electrodes by way of introduction of a sacrificial electrode or media 340. Thus, the EC unit 311 may have a sacrificial or consumable media 340 filled or otherwise disposed therein.

The EC unit 311 may have one or more electrodes 312 made of a durable metal, such as aluminum or titanium, or any suitable noble metal. The EC unit 311 may be configured with one or more sets of electrodes 312 that may be alternately connected to a respective positive 313*a* and negative portion 313*b* of a current source, such as the rectifier 314 (via two busbar conductors 334—one connected to positive, one connected to negative). Although embodiments herein refer to a busbar 334 (typically rigid), other ways of transferring current to the electrodes may be used, such as flexible cabling.

With respect to the sacrificial media 340, this may be one or more pieces formed of multivalent ion producing metal as described herein. The sacrificial media may take any shape suitable for facilitating electrocoagulation within the unit 311.

Referring briefly to FIGS. 5A-5E, a side view of a wavy media, a side view of a loose spiral media, a side view of a tight spiral media, a side view of a curved media, and a side view of a combination linear-curvilinear media, respectively, in accordance with embodiments disclosed herein, are shown.

Figure 5C:
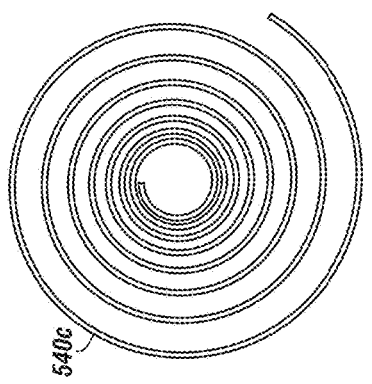
FIG. 5C shows a side view of a tight spiral media according to embodiments of the disclosure.
Figure 5B:
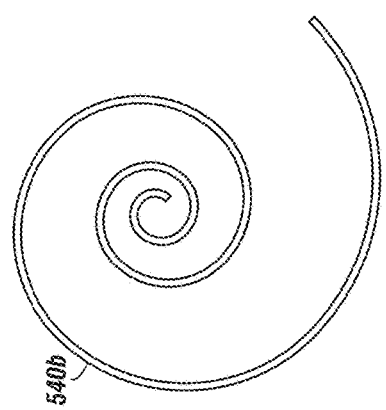
FIG. 5B shows a side view of a loose spiral media according to embodiments of the disclosure.
Figure 5A:
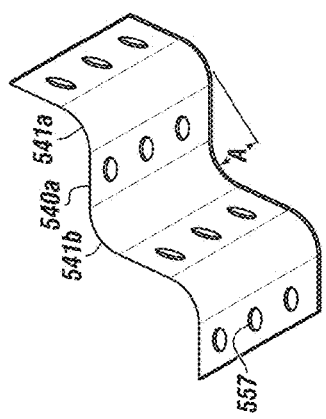
FIG. 5A shows a side view of a wavy media according to embodiments of the disclosure.
Figure 5E:
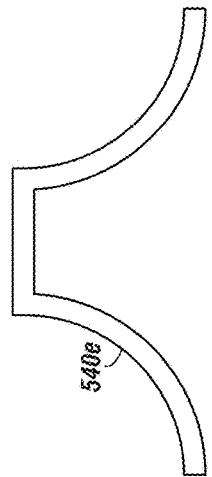
FIG. 5E shows a side view of a combination linear-curvilinear media according to embodiments of the disclosure.
Figure 5D:
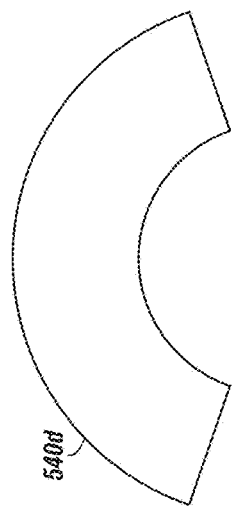
FIG. 5D shows a side view of a curved media according to embodiments of the disclosure.

FIGS. 5A-5E readily depict a sampling of shapes for use as the sacrificial media 540*a-e*. Other non-limiting examples include oval, cylindrical, zig, zag, wavy, curvy, spiral, twisted, crescent, balls or spheres, symmetrical, non-symmetrical, etc., and combinations thereof. Other shapes include woven metal, cloth, mesh, woven metal pads, sheeting, and planar strips. The sacrificial media may include one or more perforations (such as shown in FIG. 5A) to facilitate quicker surface contact with the fluid, and thus an increase in efficiency of media consumption. The use of perforations may also prevent the pocketing or collecting of gas against irregular shape.

Although not meant to be limited, sacrificial media of the present disclosure may have an effective shadow foot print of about 1"×1" to about 6"×6". In generally, the largest dimension across the sacrificial media may be less than the distance of the electrode spacing gap (315). Were the dimension to be larger, then the greater chance of a pseudo-short circuit within a particular EC cell (341) by way of direct contact end-to-end between the media the respective electrodes, which is undesired.

In embodiments there may be a trough 541a and a crest 541c, with an amplitude A therebetween (with one or more perforations 557). In embodiments, there may be about 2 to about 4 rows of perforations, each row having about 2 to about 7 perforations. Because of the additional surface of the media 540a, there is more surface area of the media versus an effective shadow foot print area. By way of an example, a 3"×3" piece, with an amplitude (or height) A of about 0.5" may have a surface area of 15" (thus flattened may be about 5"×3"), whereas the shadow foot print is 9". The more surface area per volume of sacrificial media, the more media that can be used, and thus the replacement cycle time increased. In cross-section, the media 540a may be curvilinear (including a radius at the trough(s) and crest(s)).

The size and volume of sacrificial media may be selected to synergize fluid flow and reaction. Too little or small (or too compacted) media may reduce the reaction ability (or conductivity bridge), whereas too much or too large of media may impede fluid flow rates.

The sacrificial media (or any piece thereof) may have a thickness in a range from about 0.1 inches to about 0.001 inches (including all dimensions in between), and the thickness may be uniform (or substantially uniform with known tolerances) or may have variation. In embodiments, the thickness of the sacrificial media may be about 0.001" to about 0.005".

The sacrificial media may be filled or otherwise disposed into a 'cell' region in an EC unit (311) proximately between respective electrodes. The volume of any given cell may be filled with about 50% to about 75" of sacrificial media.

Returning again to FIGS. 4A-4B, it is worth noting that the sacrificial media need not be uniform whereby different shapes and sizes, with differing dimensions, may be used simultaneously. As the sacrificial media 340 may be consumed, the EC unit 311 may be configured for easy access so replacement media may be filled or otherwise disposed therein. Thus, the unit 311 may have a first portion 328a, such as a top or lid, sealingly, but releasably, engageable with a bottom portion 328b. The first portion 328a and second portion 328 may be releasably coupled together in any suitable manner, such as via nut and bolt. For additional convenience, the EC unit 311 may be configured with a davit arm assembly 327. One of skill would appreciate that the davit arm assembly 327 may make it easy to lift and separate the first portion 328a from the second portion 328b. Moreover, the assembly 327 may provide a pivot point, whereby the first portion 328a may be sufficiently moved out of the say so that media 340 may be properly replaced into the EC unit 311.

The entire process of opening, replacing, and sealing may take about 5 minutes to about 10 minutes, which is a remarkable improvement to traditional electrode replacement. This may further include switching from a first train to a second train (i.e., a second or redundant EC unit) of the EC skid 308, as well as depressurizing, draining, and/or purging (such as with N2) the EC unit 311. It is anticipated that replacement cycle for sacrificial media may be on the order of hours, such as once per shift, or even once per 1-2 days, or longer depending quality and constituent make-up of fluid being treated.

Because the EC unit 311 may be pressurized, the unit housing (or outer shell) 330 may be metallic. In order to avoid or prevent conducting electricity to the housing, the unit 330 may be lined with an insulator, or grounded. The unit 311 may have one or more inner housings 329 disposed therein. The inner housing 329 may be made of a non-conductive material, such as polypropylene, fiberglass, carbon fiber, and so forth.

As shown here the unit 311 may be generally cylindrical in shape, and the inner housing 329 may be generally rectangular prism (or box) in shape, however, embodiments herein are not meant to be limited and other shapes are possible.

Figure 4D:
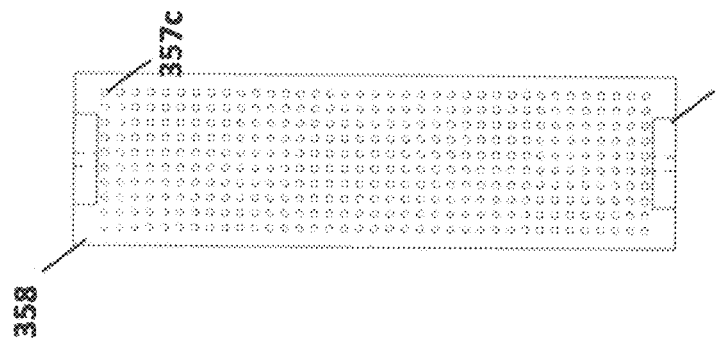
FIG. 4D shows a downward view of a perforated insert for the EC unit of FIG. 4C according to embodiments of the disclosure.
Figure 4C:
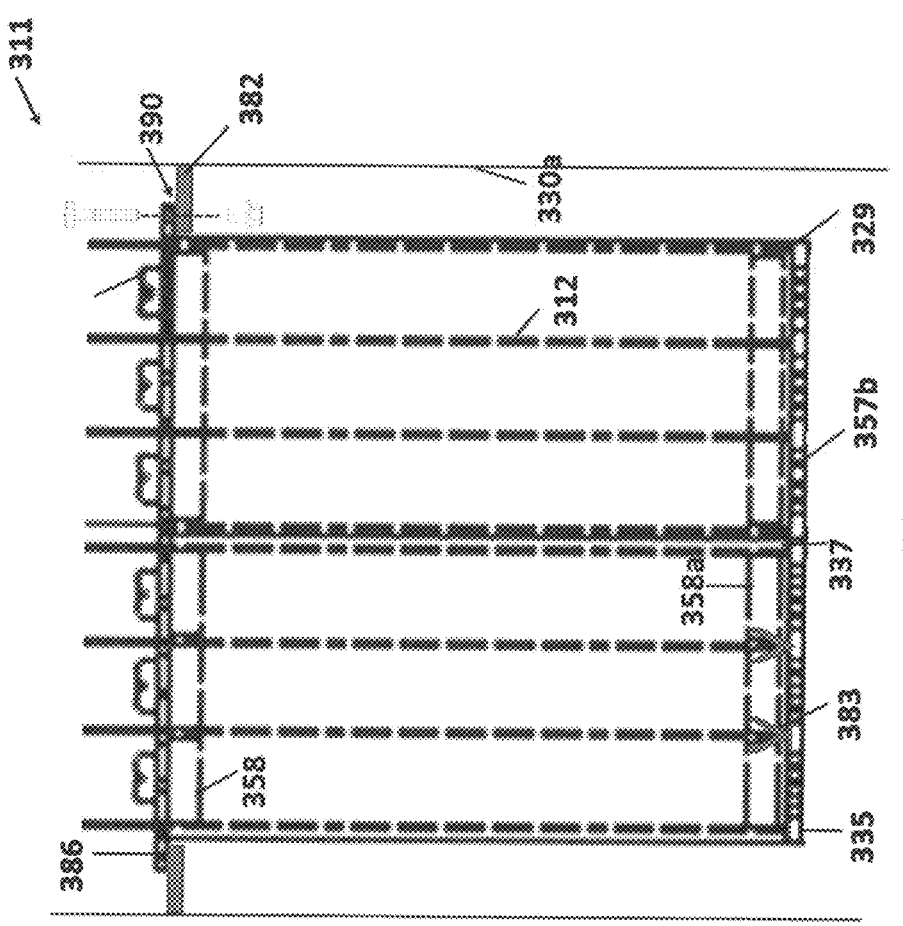
FIG. 4C shows a partial side cross-sectional view of an inner housing disposed within an EC unit according to embodiments of the disclosure.

Referring briefly to FIGS. 4C and 4D together, a partial side cross-sectional view of an inner housing disposed within an EC unit, and a downward view of a perforated insert for the EC unit of FIG. 4C, respectfully, in accordance with embodiments disclosed herein, are shown.

FIG. 4C shows the EC unit 311 may include the annular ring mount 382 mounted or otherwise extending inward from an inner wall 330a. The ring mount 382 may be integral or otherwise connected, welded, etc. with the inner wall 330a. The ring mount 382 provides additional stability to the housing 329 (or lip 386) via a mount connection point 390 therebetween. As the EC unit 311 may have continuous fluid flow therethrough, including at high rates, it may be useful to provide stabilization to the housing 329. A bottom 335 of the housing 329 may have one or more perforations (including a plurality of perforations) 357b to accommodate fluid flow through the unit 311.

A top or upper region of the housing 329 may be open. However, it may be easier to maintain sacrificial media within the cells (between respective electrodes 312) by using one or more perforated inserts 358. The perforated insert 358 may have a plurality of perforations 357c. The inserts 358 may be sized to fit within the space between each adjacent electrodes and respective sidewalls of the housing 329. In embodiments, there may be two half-size inserts 358 for each respective cell tantamount to the insert 358 shown in FIG. 4D being cut in half.

To maintain the position of the perforated inserts 358, they may be coupled with the sidewalls of the housing 329. In addition, or in the alternative, a retention member (see cover plate 356A, FIG. 4B) may be used. In addition to a releasably attachable cover plate, other means of retention are possible, such as a retention bar extending longitudinally from one end of the housing 329 to the other. The retention member may couple along one or more points of the inner housing mount ring 382. In the event of multi-piece insert is used, there may be multiple retention members. The retention member may be non-conductive.

The inner housing 329 may include another grate or junk trap 358a (which may be perforated. The bottom 335 or the grate 358a may be configured with a groove (or 'u', v-notch, etc.) 383 for which a respective bottom of the electrode 312 may fit therein. In this respect, load from the electrodes (which may each have a weight in a range of even greater than 50 lbs) may be supported by the inner housing 329 and/or the outer vessel 330. In this respect, load may be removed from the busbar (334). Moreover, the electrodes 312 may be more readily maintained in position (whereas if just 'hanging' be more susceptible to inadvertent movement).

There may be a partition 337, which may be positioned at an approximate midpoint in the inner housing 329. The partition 337 may be made of an insulating material, such as a plastic. The use of the partition 337 may be useful to control power distribution from the busbar 334 to the electrodes 312.

Returning again to FIGS. 4A and 4B, the electrodes 312 may each have an associated surface area. The use of inner housing 329 may be suitable to ensure the surface area of respective electrodes 312 may be uniform. It is worth noting that the respective electrode shapes may each vary, yet still have uniform surface area. Moreover, although shown here as generally rectangular planar plates, the electrodes 312 may have other shapes, including non-planar (i.e., with curvature).

As one of skill may appreciate, typical EC utilizes a 'dry' connection. That is, power is connected to a dry portion of an electrode open to the surrounding air/atmosphere, with the remaining portion being submerged in the fluid. Embodiments herein provide for not only a dry connection, but also a 'wet' connection, which may be particularly useful for an EC reaction under pressure. The ability to operate 'wet' may be of significant importance for O&G operations, and particularly offshore O&G operations, where stringent HAZLOC requirements and/or other rules and regulations must be met.

A wet connection may allow for greater temperature control and avoid undesired energy loss that may normally be associated with a dry connection. Energy loss from heat buildup equates to power loss, and thus less current transfer, greater chances of passivation, and ultimately reduced ability for agglomeration of contaminants and/or emulsion breaking.

A wet connection may further allow operation of the EC unit 311 under pressure, mitigation or elimination of safety concerns associated with dry operation "headspace", and mitigation or elimination of pumping of EC fluid which not only eliminates a pump(s) but maintains the coagulated state of the floc and pollutants. That is, putting coagulated floc through a pump may tear up or destabilize the floc, which would require either time or chemical to make the floc re-coagulate (thus a significant reduction, an elimination of chemical addition, and/or improved effluent quality).

Operating under pressure may enable EC-generated gases to break out in any downstream flotation unit, and thus be used as a source for (micro)bubble generation and enable excess gases to be transferred to LP flair systems at the end of the process instead of venting to a "safe" area. Venting on an offshore facility is a risk, "safe" area or not, therefore operating the EC under pressure reduces operational risks. Moreover, many operations associated with O&G operations are known to be pressurized for numerous reasons. In this respect, fluid $F_i$ may continuously flow freely through the unit 311 (including through the inner housing 329 and related cells 341 (volume of space between adjacent electrodes), as well as in contact with the sacrificial media 340 and busbar(s) 334). In embodiments the EC unit 311 may be substantially liquid flooded and pressurized.

The busbar 334 may be a conducting coupler type piece suitable for transferring power (current) from a power supply or rectifier into the EC unit 311, and to the electrodes. Although the busbar 334 may be generally planar or rectangular prism in shape, embodiments herein are not meant to be limited, and other busbar shapes are possible, such as tubular, cylindrical, or oval (in cross-section), elliptical (in cross-section), and may be non-symmetrical. It is within the scope of the disclosure that the busbar 334 for the negative side may be the same or may be different from that of the positive side.

Further consideration is required for the circumstance when the EC unit 311 may be operated under pressure, as the busbar 334 must be coupled in a manner that does not result in the outer housing 330 being electrified. Thus, a pressure gland assembly 333 may be used (for each of the positive and negative sides). The pressure gland 333 may include a gland body 344 encapsulated or otherwise sealingly disposed around at least a portion of a gland power bar 347.

A portion 350 of the gland 333 may be sealingly compressed between faces of respective flanges 325, 332. The flange 325 may be part of a spool piece 342 coupled between the gland assembly 333 and the rectifier 314. The spool piece 342 may be coupled to the rectifier at connection point 331. Naturally there may be two spool pieces 342, one for each of the positive and negative sides. In embodiments, the spool piece may not be necessary, and a compressing flange face or other suitable structure may be suitable.

The gland power bar 347 may be coupled to the busbar 334 in a manner so that it may be isolated from any contact with connection flanges 332 (*a, b*) of the EC unit 311, respectively. The gland 333 may be configured to maintain pressure of the EC unit 311 even though the power bar 347 may pass or be encapsulated therein. On the other side, the gland power bar 347 may be coupled to a rectifier power bar 351, which then itself is electrically coupled within the rectifier 314.

Although described herein as 'bars', and contemplated as rigid, other embodiments are possible, whereby any of the rectifier bar 351, gland power bar 347 and/or busbar 334 may be flexible, such as cabling (braided wire and so forth). Moreover, the geometry of any 'bar' is not meant to be limited, as other shapes may be possible, such as circular, helical-wound, zig-zag, curvilinear, and others.

As industrial convention typically requires rounded or circular flange faces, it may be further the case that the gland assembly 333 may need to be shaped correspondingly. Referring briefly to FIGS. 6A, 6B, and 6C together, an isometric view of a pressure gland assembly, a partial side cross-sectional component breakout view of a pressure gland assembly associated with an EC unit and a spool piece, and a partial side cross-sectional assembled view of the components of FIG. 6B, respectfully, in accordance with embodiments disclosed herein, are shown.

The gland assembly 633 may be suitable for use in a fluid treatment system, such as system 200. While it need not be exactly the same, the pressure gland assembly 633 may include various features and components like that of gland 333 or other units described herein, and thus components thereof may be duplicate or analogous.

The gland 633 may have a main gland body 644, which may be generally cylindrical. One of skill would appreciate the gland 633 may be a multi-part device that may include the gland body may be formed or otherwise molded, encapsulated, etc. around a gland power bar 647 (the gland power bar 647 being suitable for conducting power into an EC unit (611—partial view, or see 311, FIG. 4B) via coupling with busbar 634. The size of the gland assembly 633 may be a function of how much power transfer is required. Thus, more power may mean a bigger bar 647, which may mean a bigger gland body 644.

FIG. 6B illustrates the gland power bar 647 being separately viewable from the gland body 644, thus revealing what may be tantamount to a gland opening or passageway 645. The gland body 644 may be bonded (mechanically or chemically), molded, epoxification, fused, glued, cured, etc. with the gland power bar 647, or any other type of connection whereby the gland assembly 633 may be able to withstand pressure. In embodiments, the gland 633 may be rated to withstand upwards of 225 psi. The main gland body 644 may be made of rubber, plastic, composite, or comparable compressible material suitable for maintaining a pressure seal.

The body 644 may have an effective outer diameter suitable to conform within whatever piping, conduit, etc. may be coupled with the assembly 633. For a non-limiting example of scale, in embodiments, the outer diameter of the body 644 may be about 1" to about 8". The length of the power bar 647 may be configured to accommodate whatever distance may be needed to couple the rectifier (314) with the EC unit (311).

Any bar or other conducting component external to the EC unit (311) may be copper, Ti clad copper (or other conductive material), may have a surface coating. Any bar or other component exposed to fluid flow within the EC unit may also be Ti clad copper (or other conductive material), may have a surface coating. In this respect, the busbar 634 as well as one of the ends of the gland power bar 647 may be coated with a highly conductive material (such as platinum) for the metal-to-metal connection, whereas remaining areas exposed to liquid may be coated with a dielectric insulator, such as Plastisol.

There may be an outer lip or sealing surface 650 that may be integral or otherwise coupled to the gland body 644. Although not meant to be limited, the outer lip 650 may be formed as an annular bulge around an approximate midpoint of the gland body 644.

As one of skill would appreciate the gland body 644 may be configured, shaped, sized, etc. for either end to fit within respective flanges 625, 632 (of respective piping, spool piece, etc.). In a similar manner, the lip 650 may be configured, shaped, sized, etc. for compressing, squeezing, etc. between faces of the respective flanges 625, 632. Accordingly, the gland body 644 and the slip 650 may be generally cylindrical (and round in lateral cross-section). The lip 650 may have an effective lip outer diameter of suitable length to form the desired sealing between the flanges 625, 632. In a non-limiting example, the lip outer diameter may be about 2" to about 10".

The flanges 625, 632 and the lip 650 may be configured with various (alignable) eyelets, holes, etc. 646a for respective fasteners (e.g., nut-bolt, etc.) 649a to pass therethrough for securably coupling. In a similar manner the gland power bar 647, the rectifier power bar 651, and the busbar 634 may be configured with various (alignable) eyelets, holes, etc. 646b for respective fasteners (e.g., nut-bolt, etc.) 649b to pass therethrough for securably coupling. Other fastener configurations are possible, such as magnets or clips.

Returning again to FIGS. 4A and 4B, although the electrodes 312 are shown as disposed within the inner housing 329, the EC unit 311 is not limited to requiring such. Thus, it may well be the case that the electrodes 312 may be positioned within the unit 311 itself, which may be the case when the unit 311 may be configured with an inner insulator (such as on the inner walls). Although not necessary, the electrodes 312 may each have a generally similar shape for uniformity purposes. Similarly, although there may be variation, respective electrodes 312 may have an electrode gap 315 therebetween.

The electrodes 312 may be coupled with the busbars 334 in an alternating manner That is, a first electrode (from left to right) 312 may be coupled with the busbar 334 on the positive side at first connection 313a. Although not necessary, the first connection 313a may include a jumper 339 coupled between the busbar 334 and the electrode 312. The surface area between a jumper/electrode connection may be that for which promotes the best current transfer and distribution through the unit 311. The jumper 339 may have an associated surface area, as well as a contact (or connection) surface area with that of the electrode 312. In embodiments, the connection surface area between the jumper 339 and the electrode 312 may be about 1 in$^2$ to about 6 in$^2$. The connection area between respective jumpers and electrodes may be substantially similar.

The second or next electrode 312 may be coupled with another busbar 334 on the negative side at second connection 313b. This pattern may repeat itself as may be applicable to the number of electrodes utilized, which may vary. In embodiments there may be between about 1 to about 14 electrodes. In other embodiments there may be about 6 electrodes to about 10 electrodes.

As described herein the busbar(s) 334 may be subjected to continuous liquid flow which may require consideration for mitigation or prevention of effects from electrolysis and deterioration.

Figure 7B:
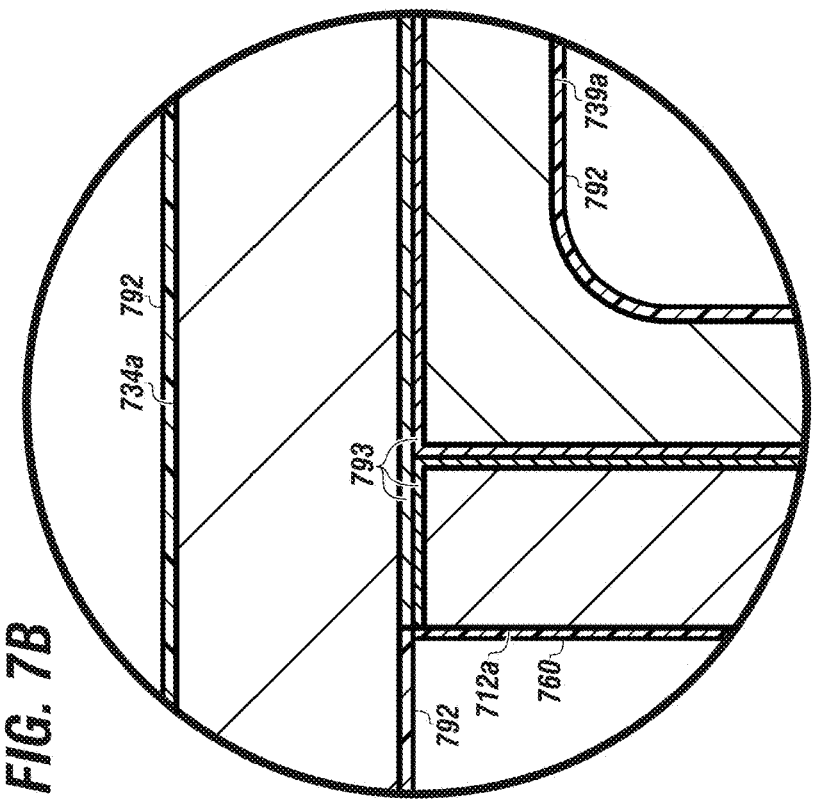
FIG. 7B shows a close-up cross-sectional view of the coupled components of FIG. 7A according to embodiments of the disclosure.
Figure 7A:
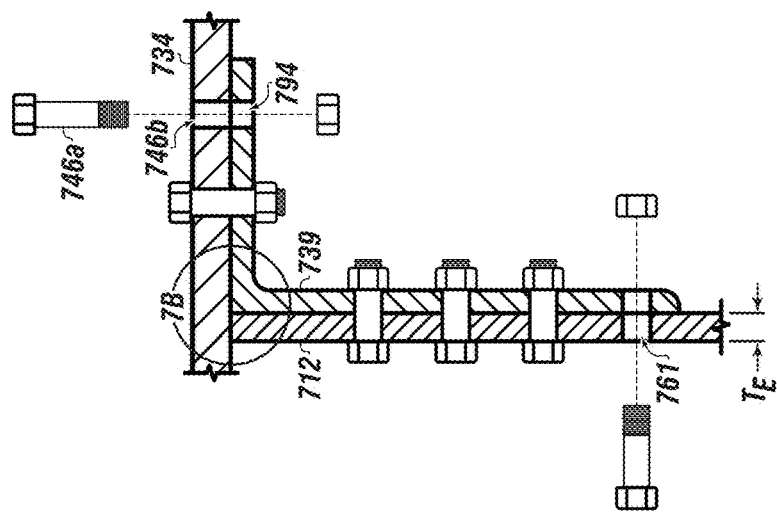
FIG. 7A shows a partial side cross-sectional view of a coated busbar coupled with a coated electrode (with a coated jumper therebetween) according to embodiments of the disclosure.
Figure 7C:
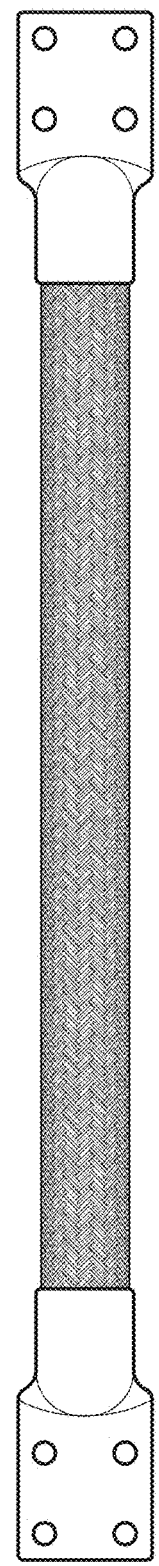
FIG. 7C shows a component view of a flexible jumper according to embodiments of the disclosure.

Referring briefly to FIGS. 7A, 7B, and 7C, together, a partial side cross-sectional view of a coated busbar coupled with a coated electrode (with a coated jumper therebetween), a close-up cross-sectional view of the coupled components of FIG. 7A, and a component view of a flexible jumper, respectively, in accordance with embodiments disclosed herein, are shown.

The electrode 712 may have a main body 712a that may be made of a durable material suitable for the transfer of current, such as a metal like titanium, stainless steel, iron, copper, etc. Because the electrode 712 is not meant to be 'sacrificed', it may be useful to use a coating to extend the longevity of the electrode life. To aid against passivation, the electrode 712 may be covered or coated with an outer surface material (or just 'coating') 760, which may be metallic. The electrode 712 may have a thickness $T_E$ of about 0.1" to about 2.5".

The electrode 712 may have an associated surface area. The electrode may have a cumulative (e.g., each side for a planar shape) electrode surface area in the range of about 1,000 in$^2$ to about 2,000 in$^2$. In embodiments, each of the one or more electrode(s) (including all) 712 disposed within an EC unit (312) may have a cumulative (e.g., each side for a planar shape) electrode surface area in the range of about 1,000 in$^2$ to about 2,000 in$^2$, where the total electrode surface area within the unit (312) may be in a range of about 10,000 in$^2$ to about 20,000 in$^2$. As a non-limiting example, the electrode 712 may be rectangular in shape with a size of about 20"×40" (with a thickness $T_E$ of about 0.25").

The electrode coating 760 may be a substantially pure noble metal, such as ruthenium. Other metals may include rhodium, palladium, silver, osmium, iridium, platinum, gold, and so forth. Also alloys of these with other metals and/or metal oxides may be used as the outer surface coating, such as iridium oxide, titanium oxide, and ruthenium Oxide may be employed with the systems of the application. The use of the coating 760 may add substantial longevity to the life of the electrode 712. The use of the coating 760 may also facilitate better gas (e.g., O2, H2, etc.) production or targeted pollutant mitigation.

The busbar 734 may be have a protective busbar coating, whereby the main body 734a of the busbar 734 may be a conductive metal, such as copper, titanium, stainless steel, iron, or an alloy titanium clad copper (e.g., Ti-Clad CU, Ti/Cu, TiCladCu, etc.). The busbar coating may be multi- or dual-layered. As shown in FIG. 7B, a first portion of the main body 734a may be coated with a dielectric non-conductive coating 792, such as Plastisol. However, a second portion of the main body 734a may have a conductive coating 793. The conductive coating 793 may be any coating material suitable for good metal-to-metal conductivity, such as platinum.

In a similar manner, the jumper 739 may be subjected to continuous liquid flow thus prompting likeminded consideration. Thus, the jumper 739 may be have a protective jumper coating, whereby the main jumper body 739a of the jumper 739 may be a conductive metal, such as copper, titanium, stainless steel, iron, or alloy such as titanium clad copper (e.g., Ti-Clad CU, Ti/Cu, TiCladCu, etc.).

The main body 739a may then have a jumper coating. The jumper coating may be multi- or dual-layered. As shown in FIG. 7B, a first portion of the main body 739a may be coated with a dielectric non-conductive coating 792, such as Plastisol. However, a second portion of the main body 739 may have a conductive coating 793. The conductive coating 793 may be any coating material suitable for good metal-to-metal conductivity, such as platinum.

The electrode 712 may be suitable for use in a fluid treatment system, such as system 200. While it need not be exactly the same, the electrode may include various features and so forth like that of electrode 712 or other electrode units described herein, and thus may be duplicate or analogous.

FIG. 7A illustrates the busbar 734 may be coupled with the electrode 712 via a jumper 739, as further described herein. Although not shown here, the busbar 734 may be coupled directly to the electrode 712.

The jumper 739 may be any suitable shape and material for transferring current from the busbar 734 to the electrode 712. In this respect, a rigid L-shape jumper 739 may be suitable. However, there may be instances that require more flexibility, for which FIG. 7C illustrates a flexible jumper 739b (made of braided wire or other suitable fashion to provide flexibility, twisting, and bending).

Returning again to FIGS. 4A and 4B, by positioning the sacrificial media 340 between electrodes 312, the electrodes 312 may be spaced much further apart as compared to that of traditional EC. In embodiments, a set of a cathode and a respective anode may have an associated separation gap distance 315 in a range of about 3" to about 12". In other embodiments, the gap 315 may be in the range of about 5" to about 7". A wide gap distance may advantageously promote use of the EC unit 311 in high capacity flow rate operations, yet at the same time not require excessive power normally required for conventional EC. As an illustrative example, a conventional EC unit may need to be operated at 110 volts to accommodate gap distance, whereas the EC unit 311 may be operated at 10 volts for the same. In embodiments the voltage range may be about 1 volt to about 20 volts.

It is believed the sacrificial media 340 fluidized between the electrodes 312 may function to reduce resistance across the fluid being treated. In this respect, the sacrificial media 340 acts as a pseudo-conductivity bridge between respective electrodes 312, which may be attributable to the reduced power requirement, and further mitigate (or even eliminate) the need for chemical additives during the EC process.

Rectifier 314 may be configured to convert or interface utility electricity to DC, such as that received from a power source (284, FIG. 2). The rectifier 314 may be a protectively sealed unit, which may have internal cooling such as with oil or air (or other non-conductive media). Although not shown here, the rectifier 314 may have a coupler mount, which may be internal (not viewable here). The coupler mount may be planar or have a planar surface for suitable coupling to a rectifier power bar 351. As one of skill would appreciate the rectifier 314 may have two separate interface coupler mounts, one for a 'positive' side, and one for a 'negative' side. Thus, the rectifier 314 may be configured in a manner for easy transfer of power therefrom to the EC unit 311.

In embodiments the rectifier 314 may provide a voltage in a voltage range of about 35 V to about 150 V. The voltage may be in a lower range such as about 1 V to about 20 V. The rectifier 314 may provide current in a current range of about 200 A to about 2000 A. In embodiments, the current range may be about 300 A to about 500 A. The rectifier 314 may receive power (directly or indirectly) from a regulated utility, a commercial provider, or a local source, such as a MCC (255), and the like.

During the operation of the unit 311, coagulation of solids, oils, and other contaminants results in generation of the floc. In a continuous operation, this may be ongoing with a limited residence time of about 10 seconds to about 45 seconds. The operation of the unit 311 may also result in generation of gas bubbles. The floc and the gas bubbles may flow or otherwise be directed to a respective outlet.

The EC unit 311 may have inlet 316 for receiving the fluid to be treated, and an outlet 317 for the transfer of treated fluid therefrom. The flow of the fluid through the EC unit 311 in combination with the sacrificial electrode may be continuous, and may result in an effective fluidized bed where the EC process occurs. Flow rates through the EC unit 311 may be in the range of about 1 gpm to about 1000 gpm. In an embodiment the flow rate may be about 200 gpm to about 500 gpm. Embodiments herein readily facilitate treating upwards of 35,000 BPD of contaminated fluid, including for offshore, at reduced weight and reduced manhours compared to that of conventional treatment systems.

Treated fluid from an outlet of the EC skid 308 may be directed to a storage tank or other operation, such as a post-EC treatment skid, whereby solids, floc, and other undesirables may be removed. For example, the resultant floc fluid, which may have coagulated contaminant therewith, may be transferred to post-treatment, such as a multi-stage floatation/defloc skid (309). Chemical injection may be used in transfer between EC skid 308 to the next skid. A suitable chemical for injection may be that which provides stability (e.g., bond strengthening) to the floc so that it does not readily disassociate. The chemical may be polymeric in nature or be a polymeric blend.

It may be desirous to "flip" or reverse the polarity of the electrodes of the EC unit 311. By shifting the polarity, this may prevent or at least mitigate the accumulation of contaminants that selectively travel in one direction within an electrical field.

Figure 8A:
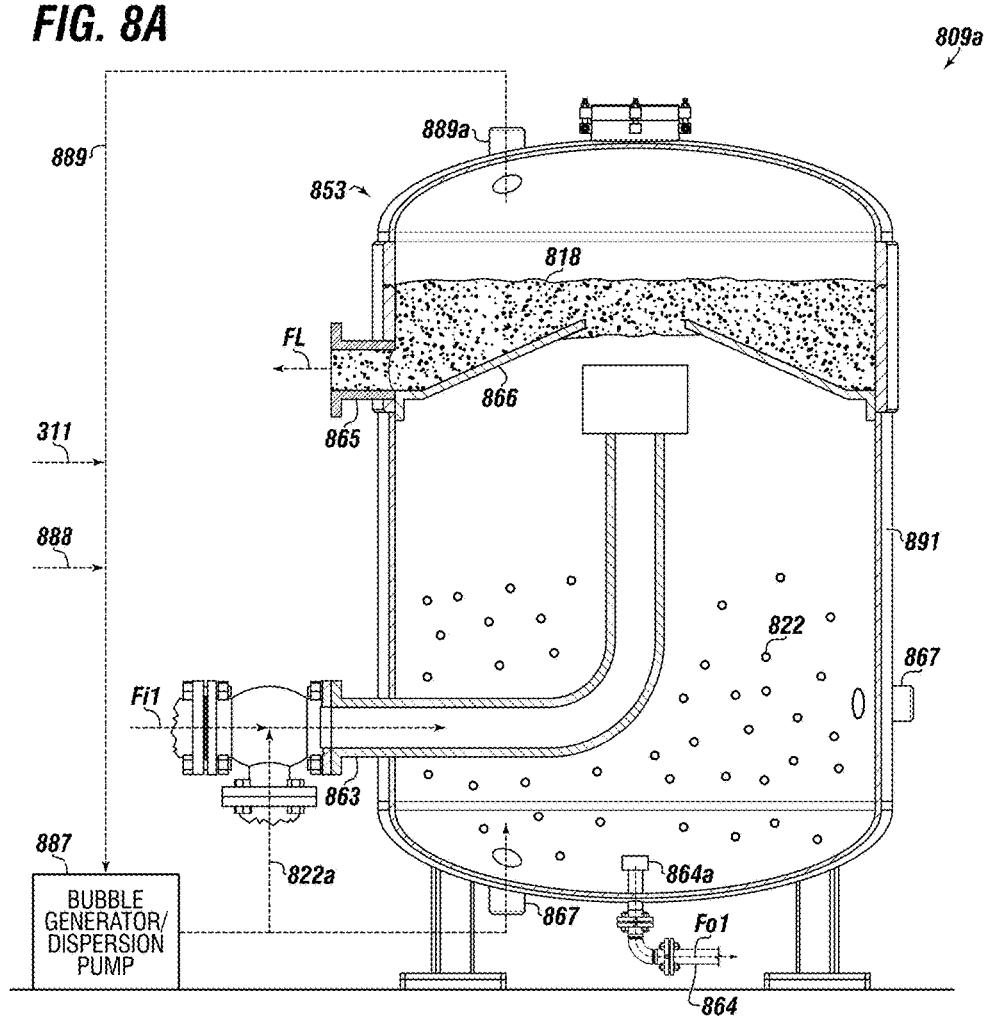
FIG. 8A shows a partial internal side view of a dissolved gas floatation (DGF) vessel of a DGF skid according to embodiments of the disclosure.

Referring now to FIGS. 8A and 8B together, a partial internal side view of a dissolved gas floatation (DGF) vessel of a DGF skid, and a partial internal side view of a compressed media vessel of a filtration skid, respectively, in accordance with embodiments disclosed herein, are shown.

FIGS. 8A and 8B together illustrate a DGF skid 809a and a filtration skid 809b usable with system and process embodiments described herein. The DGF vessel 853 may be part of the DGF skid 809a. Embodiments herein apply to the DGF skid 809a that may be an inclusive assembly of a number of components, subcomponents, etc., which may be further associated with operable systems, subsystems, assemblies, modules, skids, and so forth, including those described herein. In embodiments there may be a single or a plurality of DGF vessels 853. The skid 809a may be operable in series, parallel, or as may otherwise be desired.

In a similar fashion the filtration vessel 854 may be part of the filtration skid 809b. Embodiments herein apply to the filtration skid 809b that may be an inclusive assembly of a number of components, subcomponents, etc., which may be further associated with operable systems, subsystems, assemblies, modules, skids, and so forth, including those described herein. In embodiments there may be a single or a plurality of filtration vessels 854. The skid 809b may be operable in series, parallel, or as may otherwise be desired.

It is noted that while the either of the DGF vessel 853 or the filtration vessel 854 may be referred to as part of a 'skid' for simplicity, components of either skid need not be skid mounted. The vessels 853, 854 may be part of an overall treatment system, such as system 200. While they need not be exactly the same, vessels 853, 854 may include various features and components like that of other systems or units described herein, and thus components thereof may be duplicate or analogous.

Generally, there need not be any reject or bypass of outflow from EC unit operations described herein, so all (or substantially all) of the outflow (including gas, bubbles, liquid, and floc) from a respective EC unit (311) may be provided to the DGF vessel 853 (or optionally the filtration vessel 854). Thus, a fluid $F_{i1}$ may be fed or otherwise received into the DGF vessel 853 via DGF inlet 863. The skid 809a may include an injection system 899. Dissolved gas or bubbles feed stream 822a may be introduced into the fluid inflow and/or into vessel 853, such as via one or more injection points 867. Other forms of gas/bubbles introduction may be used, such as induced gas flotation (IGF).

As shown here, the injection system 899 may include a dispersion forming member 887 in fluid communication with various source streams and discharge (or injection) points associated with the vessel 853. The member 887 may be a high-shear mixer, dispersion pump, or any other device suitable for forming a bubble-based mixture that may then be injected into the DGF unit 853.

The injection points 867 (with respective nozzles or ports) may be located at various points on the vessel 853, such as at the bottom, the side, and combinations. For a synergistic advantage, gas generated (produced) in the EC unit (311) may be used for injection. However, other gas sources may be used, including gas from overheads 889 (via gas outlet 889a). In a similar manner, treated water 888 from any unit described herein may be used; however, other water or liquidous sources may be used. An injection stream 822a may be created by drawing fluids and/or liquids varied sources, such as a pressurized tank.

The dissolved gas within the stream 822a may be O2, O3, H2, air, or any suitable gas for prompting floatation. Although shown here as vertical, the DGF vessel 853 may have other orientations, such as horizontal. The DGF vessel 853 may be operated at atmospheric or pressurized conditions. The stream 822a may include microbubbles having an average bulk diameter of about 10 microns to about 300 microns. In some embodiments the microbubbles may be smaller with an average diameter of about 10 microns to about 30 microns. In other embodiments the microbubbles may be larger with an average diameter of about 200 microns to about 300 microns. The stream 822a, upon release into the vessel 853, may result in gas bubbles 822 released from dispersion.

During operation the vessel 853 may have a discernable liquid level differentiated by water versus that of floc 818. The vessel 853 may have an oil bucket or weir-type structure 866 for capturing floc, oil, etc. 818. The floc 818 (or $F_L$) may exit the vessel 853 via overhead outlet 865, and transferred therefrom. The DGF vessel 853 may have bottom outlet 864 for which separated/treated fluid $F_{o1}$ may exit therefrom. The outlet 864 may have or be associated with an inverted cap 864a that may be configured to prevent or obstruct solids from passing therethrough into the effluent. The fluid (or effluent) $F_{o1}$ may be transferred to additional flotation as applicable, or to filtration.

The amount of floatation may have a relationship to the amount of contamination—the greater the contamination, the more floatation that may be needed to remove floc and other contaminants to a desired specification, and vice versa.

In embodiments total retention or flotation time of fluid passing through the floatation skid 809a may be in the range of about 30 seconds to about 7 minutes. The vessel 853 may have a blanket gas, which may be nitrogen, fuel gas, or any other suitable blanket gas. The use of the blanket gas may help mitigate LEL's.

The filtration vessel 854 may receive an incoming fluid $F_{i2}$ via an inlet 870. The incoming fluid $F_{i2}$ may be that which has been treated with EC and/or DGF (e.g., $F_{o1}$). The filtration vessel 854 may be a compressible media vessel with an outer filtration vessel housing 874.

Compressible media 868 of the present disclosure may be advantageous over conventional filter cartridges and bulk media. Bulk media, for example, is dependent on numerous factors such as size, media, what is being filtered, etc. Filter cartridges are not regenerable, and require significant time and resources.

The compressible media 868 may be a unitary- or multi-piece structure of any geometry or size suitable for compression and filtration. The compressible media 868 may be a porous structure. During compression the porosity (pore size) may be reduced, and thus the filtration ability improved. Fine particles may be captured, and solids loading may be improved over that of bulk media.

The vessel 868 may include a compression assembly. The compression assembly may be or include hydraulic-, pneumatic-, or motor-driven piston 869. There may be a first plate 872a. There may be a second plate 872b. To promote or facilitate fluid flow through the vessel 854, and the filtration chamber 873, the plates 872 a, b may be perforated. The compressible media 868 may be positioned or otherwise disposed between the first plate 872a and the second plate 872b, and thus within the chamber 873.

Although not meant to be limited, FIG. 8B illustrates the first or top plate 872a may be moveable in order to compress the media 868, while the second or bottom plate 872b is stationary. However, embodiments herein may have the bottom plate 872 movable and the top plate stationary 872b. In other embodiments both plates 872 a, b may be movable.

Fluid may flow through the compressible media chamber 873 from either direction as may be desired. Thus, fluid may flow either from the top down, or from the bottom up. The vessel 854 may be configured to be switchable therebetween. FIG. 8B illustrates the direction of flow may be from the bottom to the top of the vessel 854.

The compressible media 868 may be polypropylene or polyethylene, or other porous compressible material (such as polyester) and/or hydrophobic. The vessel 854 may be operable with the compression media 868 having a compression range of about 40% to about 60% from its uncompressed state.

The floc or other contaminants present within the inlet fluid $F_{i2}$ may be readily captured with any suitable compressible media. In embodiments fluid $F_{o2}$ from the vessel 853 may be treated to filtration within vessel 854. The filtration vessel 854 may be contemplated as a tertiary filtration system configured to receive flow from any part of a water treatment system (e.g., 200), such as the EC skid (308) or the DGF skid 809a.

The compressible media 868 may be washed/backwashed (such as with pressurized water, air, or gas) as may be desired to clean the filter and remove the suspended solids trapped by the filter.

The vessel may include an outer housing 874, with a filtration chamber/bed 873 positioned within the housing 874 between the first and second plates 872 a, b. The plates 872 a, b may be perforated and thus may be configured with one or more holes/apertures (not viewable here) through which fluid may enter and exit the filtration chamber 873. The perforations may be sized to facilitate ready fluid flow therethrough, but yet retaining the filtration media 868 therein.

As mentioned, first plate 872a may be movable by way of the operable piston 869 associated therewith. The plate(s) 872 may be moved as necessary to control the degree of compression of the media 868. In operation, the media 868 may be compressed by the first plate 872a. Influent $F_{i2}$ may be distributed into the vessel 854 in a desired location via inlet 870. The influent $F_{i2}$ may be distributed evenly through the chamber 873 (and may flow upwardly the apertures in the second plate 872b). The filtered fluid or effluent $F_{i2}$ may exit the chamber 873 via apertures in the first plate 872a, and may be transferred out of the vessel via outlet 871. Suspended solids may be trapped by the media 868.

It should be recognized that channeling of wastewater around the media in the region of the wall of the housing 874, if it occurs, can be alleviated by providing a flow distribution device adjacent the apparatus wall to direct the flow of wastewater away from the wall and into the filter bed. For example, a short baffle can be attached to the wall of the housing at regular intervals to extend into the filter bed by about two inches and at an angle of about 45 degrees upward to direct the flow of wastewater off the wall and into the filter bed.

For cleaning or maintenance, the inlet 870 and outlet 871 may be reversed, and the compressed media 868 returned to an uncompressed state. Air (or other gas) or water (or other liquid) may be injected into the chamber 873 to facilitate decompression and cleaning trapped solids from the media 868.

The vessel 854 may be configured with one or more spray jets (nozzles) 867a to aid in cleaning the media 868 and the chamber 873. The jets 867a may be oriented in a manner to cause a spinning action on the media 868, thereby prompting an added cleaning benefit from centrifugal force. In addition to pressurized fluid, other agitation may be used, such as a mechanical shaker (or comparable).

Figure 9A:
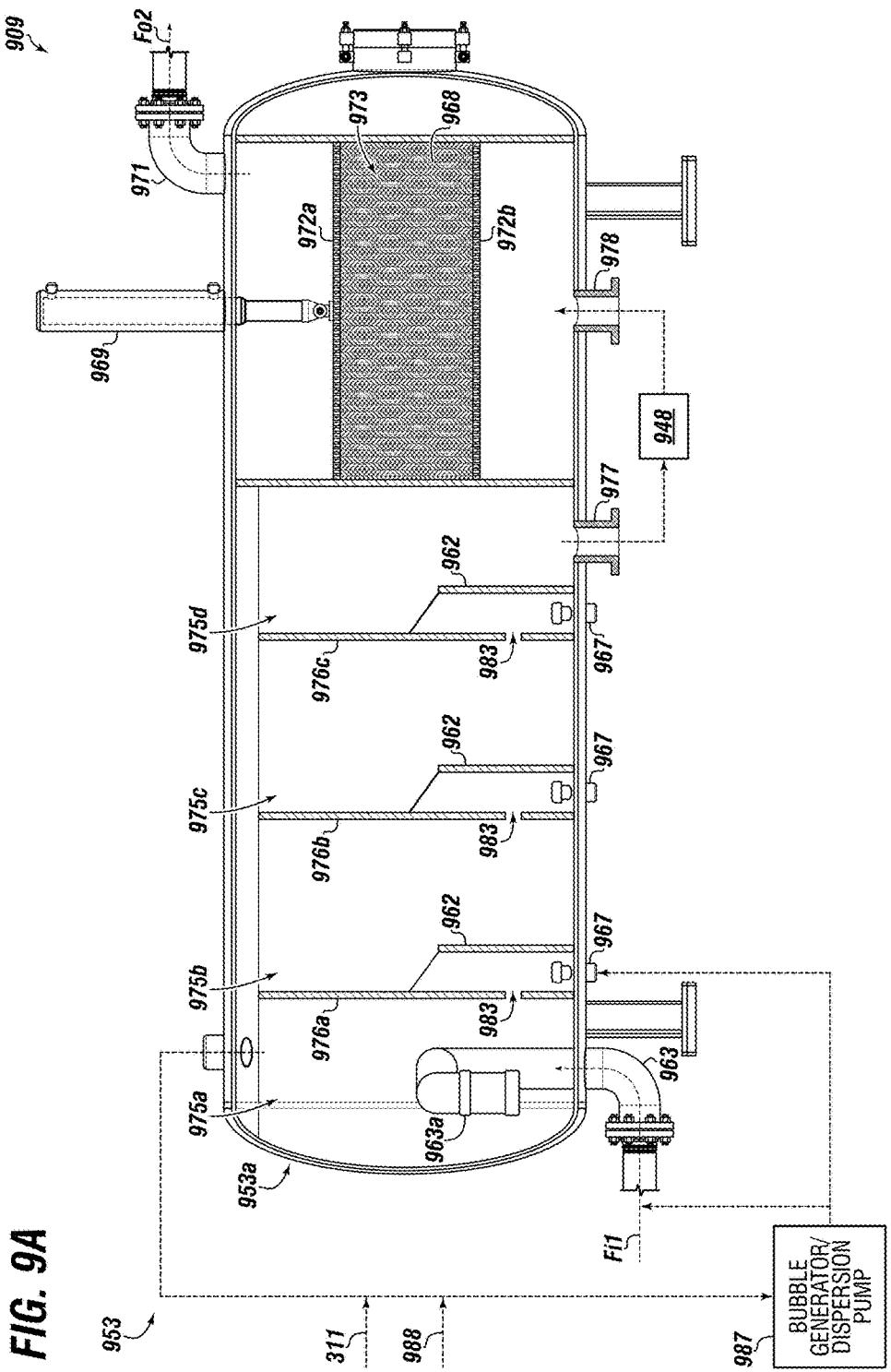
FIG. 9A shows a horizontally oriented combination dissolved gas floatation-compressible media filtration vessel according to embodiments of the disclosure.
Figure 9B:
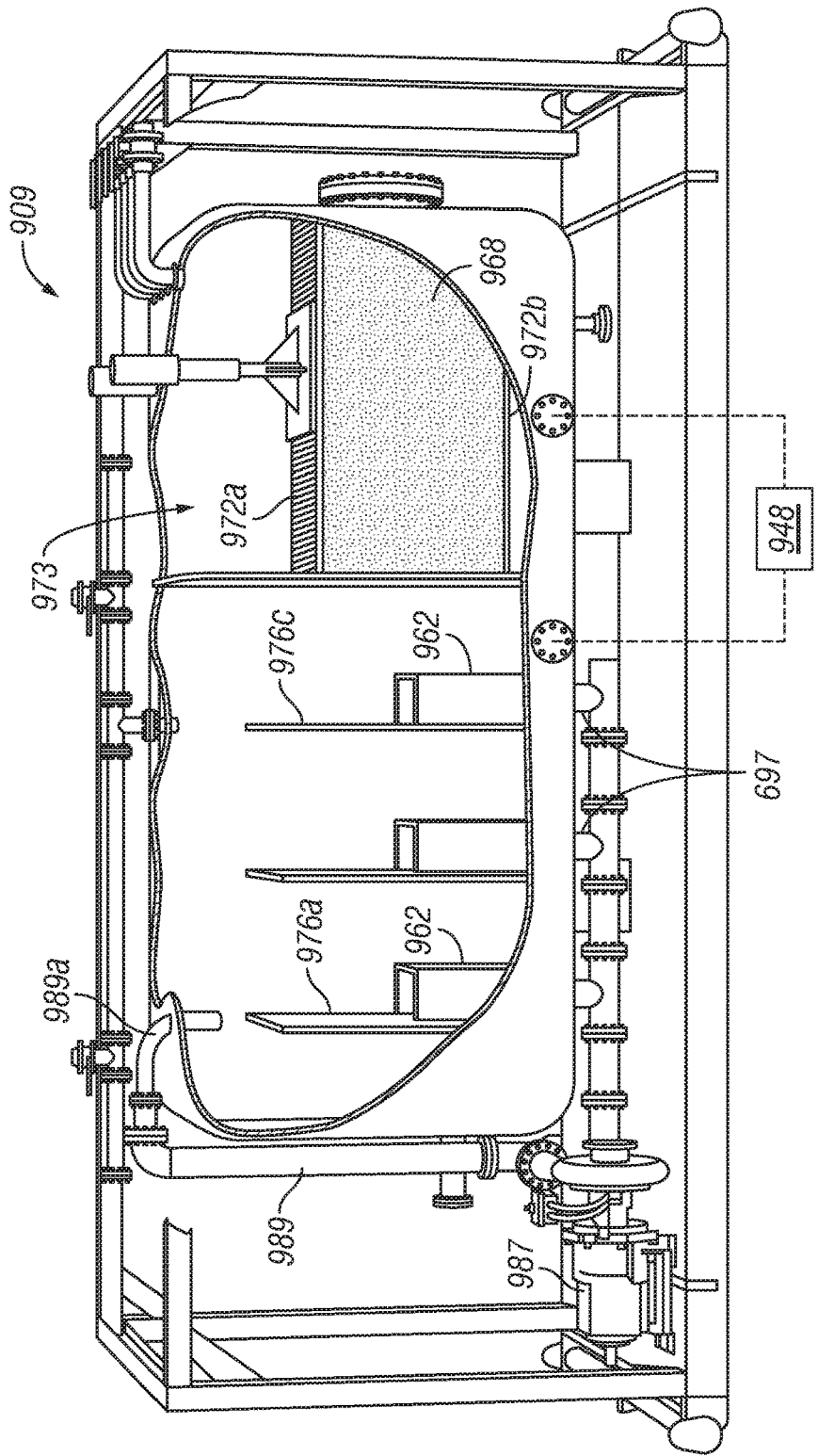
FIG. 9B shows a partial-cut side view of a vessel like that of FIG. 9A according to embodiments of the disclosure.
Figure 9D:
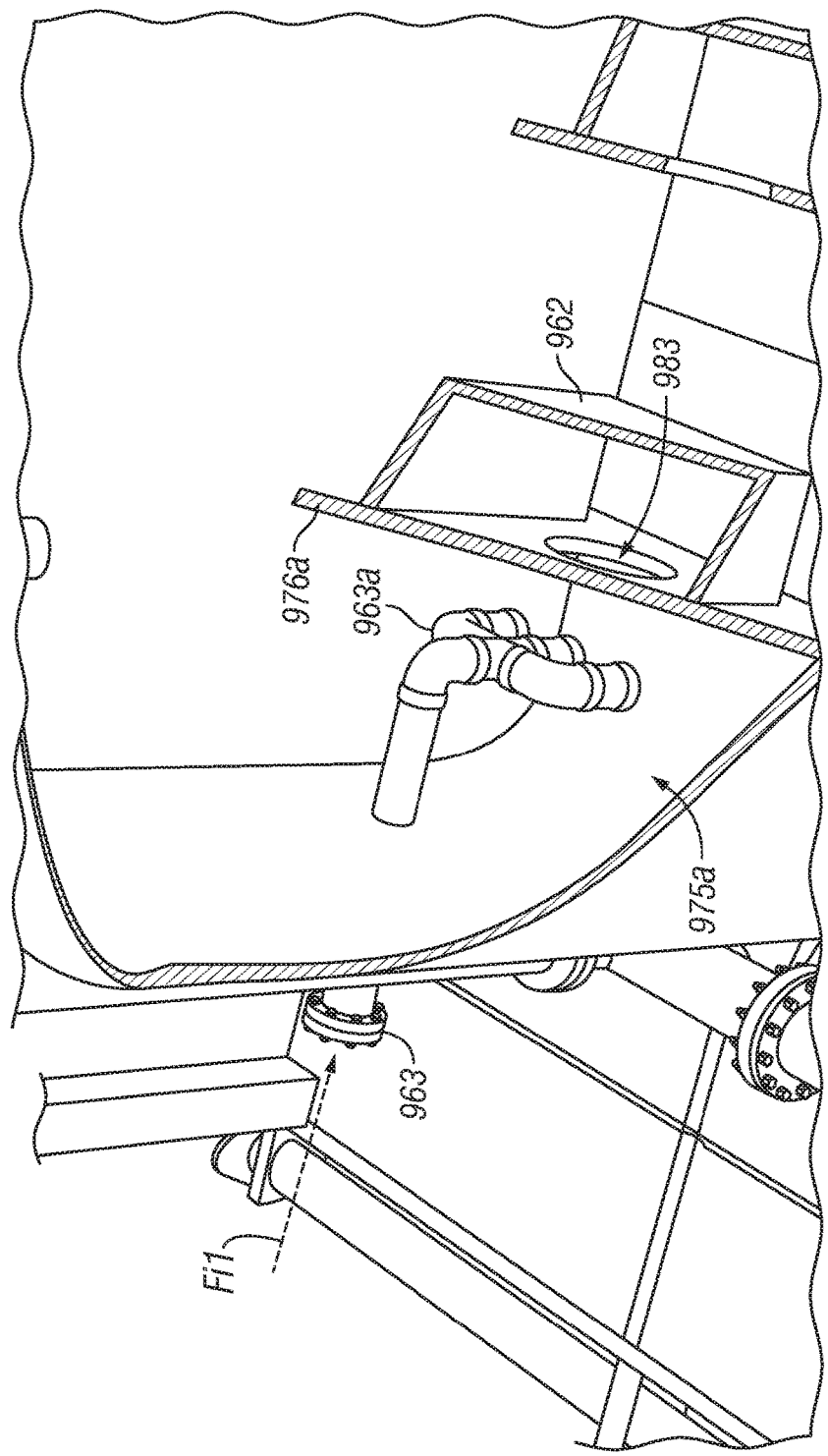
FIG. 9D shows a close-up view of a dispersion member suitable for a vessel like that of FIG. 9A according to embodiments of the disclosure.
Figure 9E:
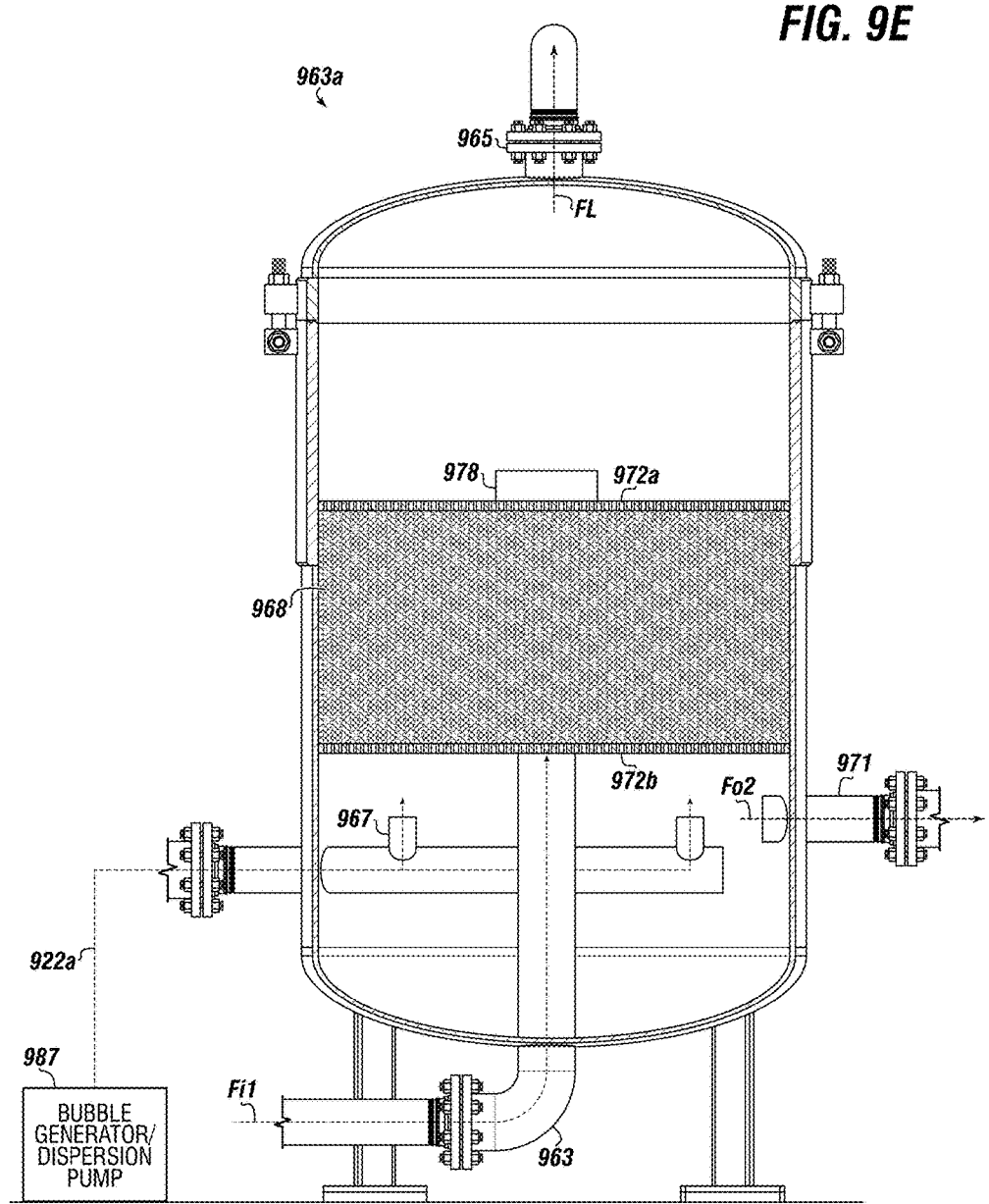
FIG. 9E shows a vertically oriented combination dissolved gas floatation-compressible media filtration vessel according to embodiments of the disclosure.

Referring now to FIGS. 9A, 9B, 9C, and 9D together, a horizontal combination dissolved gas floatation-compressible media filtration vessel, a partial-cut side view of a vessel like that of FIG. 9A, a partial-cut overhead view of a vessel like that of FIG. 9A, and a close-up view of a dispersion member suitable for a vessel like that of FIG. 9A, respectively, usable with system and process embodiments described herein, are shown.

FIGS. 9A-9D together illustrate a combination DGF/filtration vessel 953 may be part of a post-EC treatment skid 909 with a horizontal orientation. Embodiments herein apply to the treatment skid 909 that may be an inclusive assembly of a number of components, subcomponents, which may be further associated with operable systems, subsystems, assemblies, modules, skids, and so forth, including those described herein. In embodiments there may be a single or a plurality of combination vessels 953. The skid 909 may be operable in series, parallel, or as may otherwise be desired. There may be a plurality of skids 909, such as an "A train" and a "B train". The combination vessel 953 may have respective piping, manifold, transfer pump, etc. to facilitate process fluid flow, particularly from outlet 977 to inlet 978, as well as from zone 973a to zone 973b.

It is noted that while the combination vessel 953 may be referred to as part of a 'skid' for simplicity, components of the skid need not be skid mounted. The vessel 953 may be part of an overall treatment system, such as system 200. While they need not be exactly the same, vessels 953 may include various features and components like that of other systems or units described herein, and thus components thereof may be duplicate or analogous.

Generally, there need not be any reject or bypass of outflow from EC unit operations described herein, so all (or substantially all) of the outflow (including gas, bubbles, liquid, and floc) from a respective EC unit may be provided to the vessel 953. Thus, a fluid $F_{i1}$ may be fed or otherwise received into the vessel 953 via an inlet 963. The skid 909 may include an injection system 999. Dissolved gas or bubbles feed stream 989 may be introduced into the fluid inflow and/or into vessel 953, such as via one or more injection points 967. Other forms of gas/bubbles introduction may be used, such as induced gas flotation (IGF).

As shown here, the injection system 999 may include a dispersion forming member 987 in fluid communication with various source streams and discharge (or injection) points associated with the vessel 953. The member 987 may be a high-shear mixer, dispersion pump, or any other device suitable for forming a bubble-based mixture that may then be injected into the combination unit 953.

The injection points 967 (with respective nozzles or ports) may be located at various points on the vessel 953, such as at the bottom, the side, and combinations. For a synergistic advantage, gas generated (produced) in the EC unit (311) may be used for injection. However, other gas sources may be used, including gas from overheads 989 (via gas outlet 989a). In a similar manner, treated water from any unit described herein may be used; however, other water or liquidous sources may be used. An injection stream 922a may be created by drawing fluids and/or liquids varied sources, such as a pressurized tank.

The dissolved gas within the stream 922a may be O2, O3, H2, air, or any suitable gas for prompting floatation. Although shown here as horizontal, the vessel 953 may have other orientations, such as vertical (see FIG. 10). The combination vessel 953 may be operated at atmospheric or pressurized conditions. The stream 922a may include microbubbles having an average bulk diameter of about 10 microns to about 30 microns, but other bubble sizes are possible. The stream 922a, upon release into the vessel 953, may result in gas bubbles 922 released from dispersion.

The vessel 953 may be contemplated as having one or more compartments or zones 975 (e.g., 975a-d). The first zone may be inlet zone 975a, which may be where incoming influent fluid may be introduced via a dispersing member 963a. In this zone gas bubbles (or other suitable injection stream) 922a may be injected. The stream 922 may also be injected into the inlet line 963 for immediate contact time and/or a separate gas inlet. The zone 975a (and any other respective zone) may be delineated from other zones via first flow diverter 976a (or b-c, etc.). Any diverter 976 may span the entire width and height of the zone but may be further configured with a passage or opening 983.

It is within the scope of the disclosure that the vessel 953 may be configured with a first flotation zone, followed by a filtration zone, followed by a second flotation zone, followed by a second filtration zone, and so forth.

Diverters 976 herein may be configured to inducing fluid to flow in a specific path that promotes floating contaminates towards the oil/reject bucket 918, as well as the liquid through openings 983. On any diverter 976, and proximate to the respective opening 983, may be a box baffle 962. Typically, the box baffle 962 will be on the outflow side of the diverter 976. The box baffle 962 (which may have a top opening 962b and a bottom opening 962a) may be configured for guiding fluid flow into the next zone 965, as well as being proximate to the point where injection point 967 may be located (and thus contact with injection stream 922a). Although shown here as parallel to a vertical axis, the box baffle 962 may have other orientations, such as any angle between 0 and 180.

In embodiments, the box baffle 962 may be angled in a manner that urges fluid flow to a side opposite of that of the oil bucket 918. The momentum of the fluid hitting the opposite side may provide a carom effect for any floc collecting on that side and provide additional urging to move the floc toward the oil bucket 918.

Gasses and some solids or phase separated non-aqueous fluids may be collected at the top of any zone 975. The (micro)bubbles from gas injection may facilitate push and/or float contaminates, oil, floc, and the like to the surface for removal, which may be by skimming or other comparable collection. This process may be repeated in subsequent zones 975 b, c, with the water content improving in each subsequent zone.

During operation the vessel 953 may have a discernable liquid level differentiated by water versus that of floc. The vessel 953 may have an oil bucket or weir-type structure 966 for capturing floc, oil, etc. The floc (or $F_L$) may exit the vessel 953 via an overhead outlet (not viewable here) and transferred therefrom. The fluid (or effluent) $F_{o2}$ may be transferred to additional flotation as applicable, or to filtration.

In the fourth or last zone 975d, there may be an interim vessel outlet 977 whereby fluid may transfer therefrom (such as via transfer region 948) into an interim vessel inlet 978. The transfer region 948 may include various piping, manifolds, pumps, etc. for transferring fluid from outlet 977 to inlet 978, and through the rest of the filtration portion).

The filtration zone 973 may receive an incoming fluid, which may be that which has been treated with EC and/or DGF. The filtration zone 973 may have a compressible media 968 having porous structure. The vessel 953 may include a compression assembly. The compression assembly may be or include hydraulic-, pneumatic-, or motor-driven piston 969. As viewable in FIGS. 9B and 9C the vessel may have two separate filtration compartments (which may be operable as 'coarse' and 'fines' filtration.

Accordingly fluid may be introduced into the media filtration chamber 973. Between compression plates 972 a, b, may be a compression media 968. The compression media 968 may be suitable to further reduce the concentration of oil and other undesirable contaminants.

Each respective compartment may have a first plate 972a. There may be a second plate 972b. To promote or facilitate fluid flow through the vessel 953, and the filtration chamber 973, the plates 972 a, b may be perforated. The compressible media 968 may be positioned or otherwise disposed between the first plate and the second plate, and thus within the chamber The fully treated fluid $F_{o2}$ may then pass out of the filtration chamber 973, and out of the vessel 953 via outlet 971. The treated fluid $F_{o2}$ may in some instances meet discharge specifications of less than 15 ppm spec of hydrocarbons, contain no suspended solids or sheen, and pass toxicity.

Figure 10:
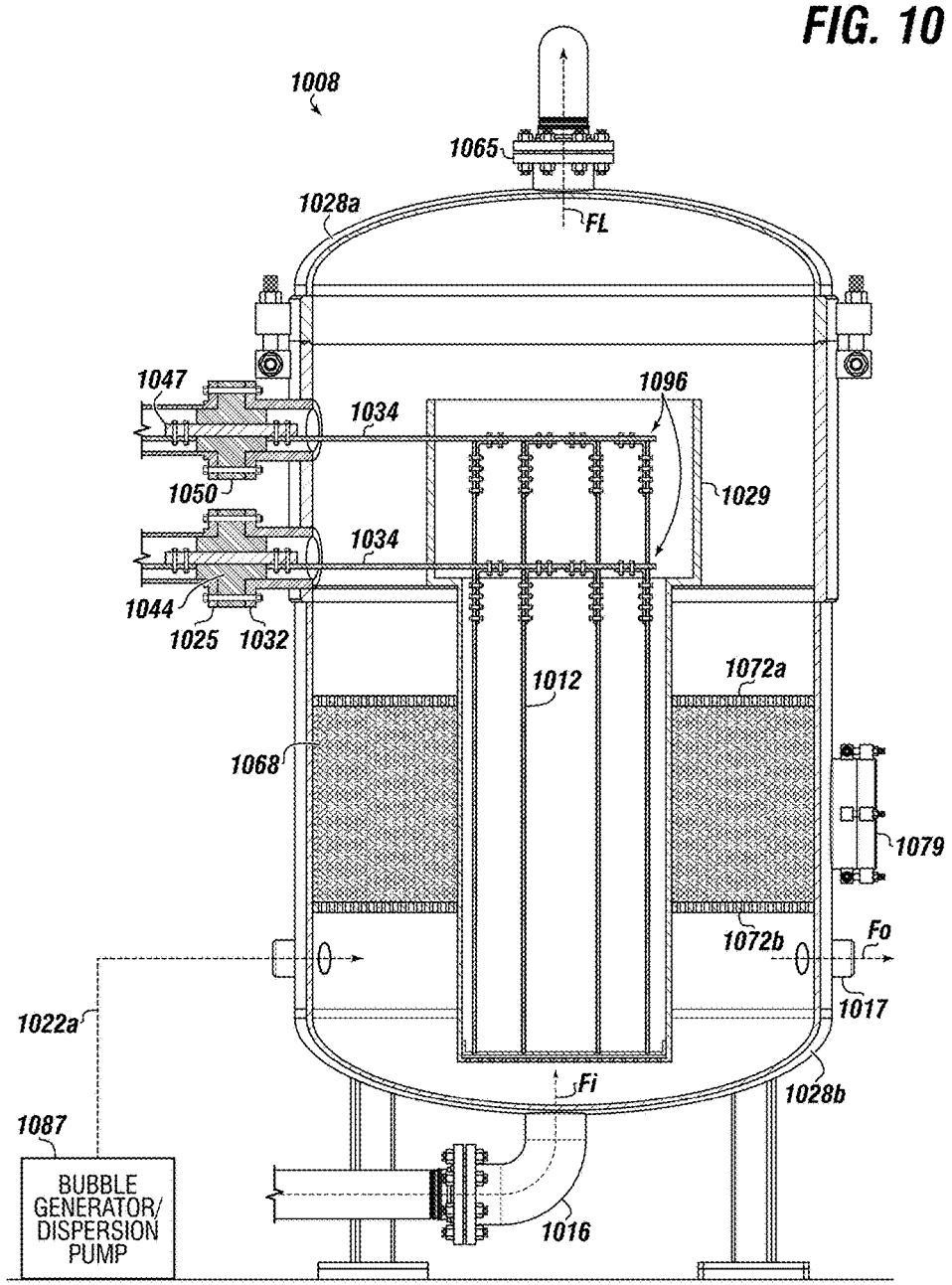
FIG. 10 shows a partial cross-sectional side view of a combination electrocoagulation-flotation-filtration vessel according to embodiments of the disclosure.

Referring now to FIG. 10, a partial cross-sectional side view of a combination electrocoagulation-flotation-filtration vessel, in accordance with embodiments disclosed herein, is shown.

Embodiments herein apply to a treatment skid that may be an inclusive assembly of a number of components, subcomponents, which may be further associated with operable systems, subsystems, assemblies, modules, skids, and so forth, including those described herein. In embodiments there may be a single or a plurality of combination vessels 1008. The skid, which may have one or more units 1011, may be operable in series, parallel, or as may otherwise be desired. There may be a plurality of skids, such as an "A train" and a "B train". The combination unit 1011 may have respective piping, manifold, transfer pump, etc. to facilitate process fluid flow.

It is noted that while the combination unit 1011 may be referred to as part of a 'skid' for simplicity, components of the skid need not be skid mounted. The unit 1011 may be part of an overall treatment system, such as system 200. While it need not be exactly the same, unit 1011 may include various features and components like that of other systems or units described herein, and thus components thereof may be duplicate or analogous.

The combination EC unit 1011 may be mounted to a frame-type structure via one or more legs or support mounts. The combination EC unit 1011 may be configured to interface or couple with a unit, operation, system, etc. whereby an incoming fluid from, for example, a source operation, a pre-treatment vessel or skid, or a CIS (301, FIG. 3) may be received. Fluid $F_i$ may be received into the EC unit 1011 via an inlet 1016, and upon treatment, may leave the EC unit via an outlet 1017 as a 'treated fluid' $F_o$.

The EC unit 1011 may be configured tantamount to an ANSI pressure vessel, which is to say the EC unit 1011 may be run under pressure. In embodiments the operating pressure of the combination EC unit 1011 may be about 50 psi to about 160 psi.

A first key aspect of the combination EC unit 1011 is the ability to provide a reaction, flotation, and filtration effect within a single unit, and thus significantly reducing size footprint.

A second key aspect of the combination EC skid 308 is the substantial reduction or outright elimination of passivation of powered electrodes by way of introduction of a sacrificial electrode or media (340). Thus, the EC unit 1011 may have a sacrificial or consumable media filled or otherwise disposed therein.

The EC unit 1011 may have one or more electrodes 1012 disposed therein as described herein. The electrodes 1012 that may be alternately connected to a respective positive and negative portion of a current source, such as the rectifier (not viewable here) (via two busbar conductors 1034—one connected to positive, one connected to negative).

The sacrificial media may be like that as described herein. Access to replace sacrificial media may be provided via access portal 1079. The combination unit 1011 may have a first portion 1028a, such as a top or lid, sealingly, but releasably, engageable with a bottom portion 1028b. Because the EC unit 1011 may be pressurized, the unit housing (or outer shell) may be metallic. The unit 1011 may have one or more inner housings 1029 disposed therein. The inner housing 1029 may be made of a non-conductive material, such as polypropylene, fiberglass, carbon fiber, and so forth.

As shown here the unit 1011 may be generally cylindrical in shape, and the inner housing 1029 may be generally rectangular prism (or box) in shape, however, embodiments herein are not meant to be limited and other shapes are possible. The coupling between Fluid $F_i$ may continuously flow freely through the unit 1011 (including through the inner housing 1029 and related cells (volume of space between adjacent electrodes), as well as in contact with the sacrificial media (not shown here) and busbar(s) 1034). In embodiments the EC unit 1034 may be substantially liquid flooded and pressurized.

The busbar 1034 may be a conducting coupler type piece suitable for transferring power (current) from a power supply or rectifier into the EC unit 1011, like that described herein.

Further consideration is required for the circumstance when the EC unit 1011 may be operated under pressure, as the busbar 1034 must be coupled in a manner that does not result in the outer housing being electrified. Thus, a pressure gland assembly 1033 may be used (for each of the positive and negative sides).

The pressure gland assembly 1033 may be like that as described herein, and thus having a gland body 1044 encapsulated or otherwise sealingly disposed around at least a portion of a gland power bar 1047. A portion 1050 of the gland 1033 may be sealingly compressed between faces of respective flanges 1025, 1032. Naturally there may be two configurations, one for each of the positive and negative sides. In embodiments, the spool piece may not be necessary, and a compressing flange face or other suitable structure may be suitable.

The gland power bar 1047 may be coupled to the busbar 1034 in a manner so that it may be isolated from any contact with connection. The gland 1033 may be configured to maintain pressure of the EC unit 1011 even though the power bar 1047 may pass or be encapsulated therein. On the other side, the gland power bar 1047 may be coupled to a rectifier power bar, which then itself is electrically coupled within the rectifier (not viewable here).

The electrodes 1012 may be coupled with the busbars 1034 in an alternating manner That is, a first electrode (from left to right) 1012 may be coupled with the busbar 1034 on the positive side at first connection (not viewable here, the first connection may include a jumper coupled between the busbar 1034 and the electrode 1012). The second or next electrode 1012 may be coupled with another busbar 1034 on the negative side at second connection. This pattern may repeat itself as may be applicable to the number of electrodes utilized, which may vary. In embodiments there may be between about 1 to about 14 electrodes. In other embodiments there may be about 2 electrodes to about 6 electrodes.

As described herein the busbar(s) 1034 may be subjected to continuous liquid flow which may require consideration for mitigation or prevention of effects from electrolysis and deterioration.

In embodiments, a set of a cathode and a respective anode may have an associated separation gap distance 315 in a range of about 3" to about 12". In other embodiments, the gap may be in the range of about 5" to about 7". A wide gap distance may advantageously promote use of the EC unit 311 in high capacity flow rate operations, yet at the same time not require excessive power normally required for conventional EC. As an illustrative example, a conventional EC unit may need to be operated at 110 volts to accommodate gap distance, whereas the EC unit 1011 may be operated at 10 volts for the same. In embodiments the voltage range may be about 1 volt to about 20 volts.

During the operation of the unit 1011, coagulation of solids, oils, and other contaminants results in generation of the floc $F_L$. In a continuous operation, this may be ongoing with a limited residence time of about 10 seconds to about 45 seconds. The operation of the unit 1011 may also result in generation of gas bubbles. The floc and/or the gas bubbles may flow or otherwise be directed to a respective outlet 1065.

The EC unit 1011 may have inlet 1016 for receiving the fluid to be treated, and an outlet 1017 for the transfer of treated fluid therefrom. The flow of the fluid through the EC unit 1011 in combination with the sacrificial electrode may be continuous and may result in an effective fluidized bed where the EC process occurs. Flow rates through the EC unit 1011 may be in the range of about 1 gpm to about 1000 gpm. In an embodiment the flow rate may be about 200 gpm to about 500 gpm. Embodiments herein readily facilitate treating upwards of 35,000 BPD of contaminated fluid, including for offshore, at reduced weight and reduced manhours compared to that of conventional treatment systems.

In contrast to EC unit 1011, the EC unit 1011 may have its inner housing 1029 disposed (and in some instances supported by) a filtration zone 1073 (NOTE: housing 1029 would be enclosed but is shown here with a partial cut internal view). One of skill would appreciate that in a liquid-filled vessel controlled by pressure, the unit 1011 may be operable with adequate control to limit the amount of liquid going overhead to being substantially floc-based, with the rest of the liquid being pressure-driven into the filtration zone 1073.

Dissolved gas or other bubble-based stream 1022a may be introduced to the unit 1011 for flotation. The bubble based-stream 1022a may be produced by an injection system 1099.

Compressible media 1068 may be used comparable to that as disclosed herein. Although not viewable here, the combination unit 1011 may include a compression assembly. The compression assembly may be or include hydraulic-, pneumatic-, or motor-driven piston. There may be a first plate 1072a. There may be a second plate 1072b. To promote or facilitate fluid flow through the filtration zone 1073, the plates 1072 a, b may be perforated. The compressible media 1068 may be positioned or otherwise disposed between the first plate 1072a and the second plate 1072b, and thus within the zone 1073. Thus, fluid may flow out of the housing 1029, and from the top down through the zone 1073. The compressible media 1068 as described herein. The filtered fluid or effluent $F_O$ may exit the unit via outlet 1017. Suspended solids may be trapped by the media 1068.

Embodiments herein provide for an electrocoagulation unit that may include one or more of: an outer shell, an inner housing which may be coupled with the outer shell; a set of electrodes disposed within the inner housing, each electrode being separated from an adjacent electrode by an electrode gap spacing. The outer shell may further include a fluid inlet; a fluid outlet; a first busbar opening; a and second busbar opening.

The unit may include a first pressure gland assembly sealingly coupled with the first busbar opening. The pressure gland may include a first gland power bar disposed within a first gland body. The unit may include a second pressure gland assembly sealingly coupled with the second busbar opening. The second pressure gland assembly may further include a second gland power bar disposed within a second gland body.

The unit may include a first busbar coupled with the first gland power bar. The first busbar may be coupled with every other electrode of the set of electrodes. The unit may include second busbar coupled with the second gland power bar. The second busbar may be coupled in an alternating manner with every electrode of the set of electrodes not coupled with the first busbar.

The unit may have a plurality (such as individual pieces) of sacrificial media disposed between each respective adjacent pair of electrodes.

An at least one electrode of the set of electrodes may have a (cumulative—front and back, etc.) surface area in a range of 1000 inches to 2000 inches. An at least one electrode of the set of electrodes may have an electrode thickness in a thickness range of 0.1 inches to 2.5 inches. The unit may have an electrode gap spacing between an at least two of the set of electrodes comprises a gap distance of 4 inches to 8 inches.

Any pieces of the sacrificial media may have perforations. In aspects, there may be set of perforations in a range of 3 perforations to 9 perforations. Any of the pieces may have a media thickness of the sacrificial media is in a range of 0.001 inches to 0.005 inches. Naturally these dimensions refer to the media prior to use.

Any of the bars may have a main bar body made of conductive metal. Any of the bars may have a surface coating. In embodiments, any of the bars may have a first surface portion coated with a dielectric material, and a second surface portion coated with a conductive material.

Any of the electrodes of the set of electrodes may have a main electrode body made of platinum. Any of the electrodes may have an outer electrode surface coating. The surface coating may be a noble metal. Similarly, any jumpers of the unit may be made of a conducting material. Any of the jumpers may have a first jumper surface portion coated with the dielectric material, and a second jumper surface portion coated with the conductive material.

Embodiments herein pertain to an electrocoagulation unit that may include one or more of: an outer shell (which may further have: a first busbar opening); an inner housing within the outer shell; a set of electrodes disposed within the inner housing, each electrode being separated from an adjacent electrode by an electrode gap spacing; a first pressure gland assembly sealingly coupled with the first busbar opening, the first pressure gland assembly further comprising a first gland power bar disposed within a first gland body; a first busbar coupled with the first gland power bar, and further coupled with every other electrode of the set of electrodes; and a plurality (such as individual pieces) of sacrificial media disposed between each respective adjacent pair of electrodes.

In aspects, the inner housing may be centrally disposed within a filtration zone. The filtration zone may include: a first perforated plate; a second perforated plate; and a compressible media disposed between the first perforated plate and the second perforated plate.

The unit may further include a fluid inlet; a fluid outlet; a second busbar opening; a second pressure gland assembly sealingly coupled with the second busbar opening, the second pressure gland assembly further comprising a second gland power bar disposed within a second gland body; and a second busbar coupled with the second gland power bar, and further coupled in an alternating manner with every electrode of the set of electrodes not coupled with the first busbar.

Any of the sacrificial media may a media thickness in a range of 0.001 inches to 0.01 inches.

Still other embodiments herein pertain to an electrocoagulation system that may include an electrocoagulation unit operably associated with a powers source and a flotation vessel.

The electrocoagulation unit may include an outer shell, the outer shell further may have: a first busbar opening; an inner housing within the outer shell. There may be a set of electrodes disposed within the inner housing. Each of the electrodes may be separated from an adjacent electrode by an electrode gap spacing. There may be first pressure gland assembly sealingly coupled with the first busbar opening. The first pressure gland assembly may include a first gland power bar disposed within a first gland body. There may be a first busbar coupled with a first end of the first gland power bar, and further coupled with every other electrode of the set of electrodes. There may be a plurality of sacrificial media disposed between each respective adjacent pair of electrodes.

The system may include the electrocoagulation unit pressurized to an operating pressure in a range of about 50 psi to 160 psi. The unit may be operated at a flow rate in a range of 200 gpm to 500 gpm. The flow of fluid entering the electrocoagulation unit may have 1000 ppm to 5000 ppm total suspended solids (TSS).

The power source may be rectifier electrically coupled with a second end of the second gland power bar.

The power source may be operable to amps to the electrocoagulation unit in an amperage range of 300 amps to 500 amps. The power source may be operable to provide volts to the electrocoagulation unit in a voltage range of 1 volt to 20 volts.

The system may include the flotation unit operably associated with an injection system. The injection system may be operated to form an injection stream comprising bubbles having an average effective diameter in a range of 10 microns to 300 microns. The treated fluid may be received into the flotation vessel, and may mix with the injection stream.

Any of the electrodes may have a main electrode body made of platinum, and any of the electrodes may have outer electrode surface coating made of a metal material. The metal material may be or include a noble metal, such as ruthenium.

Any piece of the sacrificial media disposed into the electrocoagulation unit may include or be made of multivalent ion producing metal. Any piece disposed therein may have a media thickness is in a range of 0.001 inches to 0.005 inches.

Embodiments herein pertain to a method for removing contaminants from a fluid that may include one or more steps of: disposing an amount of a sacrificial media into an electrocoagulation unit; operating the electrocoagulation unit at a pressure above atmospheric; receiving the fluid into the electrocoagulation unit; providing power to the electrocoagulation unit from a power source to electrochemically treat the fluid to form a treated fluid with a floc comprising coagulated contaminants; transferring the treated fluid to a flotation vessel; removing at least some of the floc via flotation to form a secondary treated stream; removing other contaminants of the secondary treated stream with a compressible media filtration vessel to form a treated product.

The electrocoagulation unit of the method and respective components may in accordance with embodiments herein. The flotation vessel of the method and respective components may be in accordance with embodiments herein.

Other embodiments herein pertain to method for removing contaminants from a contaminated water stream that may include one or more steps of: disposing a plurality of individual pieces of sacrificial media into an electrocoagulation unit; operating the electrocoagulation unit at a pressure in a range of 50 psi to 160 psi; transferring the contaminated water stream into the electrocoagulation unit; providing power to the electrocoagulation unit from a power source to electrochemically treat the contaminated water stream to form a treated water stream with a floc portion comprising coagulated contaminants; and transferring the treated water stream out of the electrocoagulation unit.

The electrocoagulation unit of the method and respective components may in accordance with embodiments herein. The flotation vessel of the method and respective components may be in accordance with embodiments herein.

The method may include the contaminated water entering the electrocoagulation unit comprises water having 1000 ppm to 5000 ppm total suspended solids (TSS). The contaminated water may be provided to the electrocoagulation unit at a rate of 200 gpm to 500 gpm.

The method may include the providing power step further comprise operating the power source to provide amps to the electrocoagulation unit in an amperage range of 300 amps to 500 amps, and to provide volts to the electrocoagulation unit in a voltage range of 1 volt to 20 volts.

In aspects the electrocoagulation unit may include a compressible media filtration zone.

Still other embodiments herein pertain to an electrocoagulation unit that may include one or more of: an outer shell comprising a first busbar opening; an inner housing within the outer shell; a set of 4 to 10 electrodes disposed within the inner housing, each electrode being separated from an adjacent electrode by an electrode gap spacing in a range of 5 inches to 7 inches; a first pressure gland assembly sealingly coupled with the first busbar opening, the first pressure gland assembly further comprising a first gland power bar disposed within a first gland body; a first busbar coupled with the first gland power bar, and further coupled with every other electrode of the set of electrodes; and a plurality of sacrificial media disposed between each respective adjacent pair of electrodes.

In still yet other embodiments an electrocoagulation treatment system may include an electrocoagulation unit electrically coupled with a power source.

The unit may include any of: an outer shell further comprising: an inlet, an outlet, and first busbar opening; an inner housing within the outer shell; a set of 4 to 10 electrodes disposed within the inner housing, each electrode being separated from an adjacent electrode by an electrode gap spacing in a gap range of 4 inches to 8 inches; a first pressure gland assembly sealingly coupled with the first busbar opening, the first pressure gland assembly further comprising a first gland power bar disposed within a first gland body; a first busbar coupled with a first end of the first gland power bar, and further coupled with every other electrode of the set of electrodes; and a plurality of individual pieces of sacrificial media disposed between each respective adjacent pair of electrodes. The power source may be a rectifier electrically coupled with a second end of the first gland power bar.

Still other embodiments of the disclosure pertain to a water treatment process that may include one or more steps of: associating the water treatment process with an offshore operation; receiving a treated water stream comprising floc into a flotation vessel; injecting an injection stream into the flotation vessel to interact with the treated water stream; removing floc from the treated water stream to form a secondary treated water stream; filtering the secondary treated water stream in a filtration zone to form a treated water product; and discharging at least some of the treated water product into the ocean.

The retention time of the treated water stream within the flotation vessel may be in a range of 30 seconds to 7 minutes. In aspects, the offshore operation may be associated with a floating production storage and offloading (FPSO) vessel.

The filtration zone may be within a cylindrical filtration vessel. The vessel may include a first perforated plate; a second perforated plate; and a compressible media disposed between the first perforated plate and the second perforated plate. The secondary treated water stream may be fed into the bottom of the filtration vessel and upward through the compressible media opposite to an increasing porosity gradient of the compressible media. The compressible media may include multiple pieces made of either polypropylene or polyethylene.

The treated water stream may be received from a pressurized electrocoagulation unit operated at a pressure of 50 psi to 160 psi. A gas source may be generated within the electrocoagulation unit. In aspects, the injection stream may be formed at least partially by using the gas source. The injection stream may include bubbles having an average effective diameter in a range of 10 microns to 300 microns The flotation vessel may have a horizontal orientation. The flotation vessel may have a vertical orientation.

The process may include periodically uncompressing and cleaning the compressible media, while at the same time continuing the filtering step through a second filtration zone.

The treated product may include less than 15 ppm total suspended solids (TSS).

The electrocoagulation unit of the method and its components may be in accordance with embodiments herein.

In aspects, the process may include feeding a flow of contaminated water from the offshore operation to the electrocoagulation unit at a rate of 200 gpm to 500 gpm. The flow of contaminated water may include contaminants in a range of 1000 ppm to 5000 ppm total suspended solids (TSS).

Still other embodiments herein pertain to a fluid treatment process that may include one or more of: receiving a treated fluid stream comprising floc into a flotation vessel; injecting an injection stream into the flotation vessel to interact with the treated fluid stream; removing floc from the treated water stream to form a secondary treated fluid stream; filtering the secondary treated fluid stream in a filtration zone to form a treated fluid product; and discharging at least some of the treated fluid product from the process. Components, units, etc. of the method may be in accordance with embodiments herein.

And still yet other embodiments of the disclosure pertain to a method for removing contaminants from a fluid that may include the step of: disposing an amount of a sacrificial media into an electrocoagulation unit; operating the electrocoagulation unit at a pressure in a range of 50 psi to 160 psi; receiving the fluid into the electrocoagulation unit; providing power to the electrocoagulation unit from a power source to electrochemically treat the fluid to form a treated fluid with a floc comprising coagulated contaminants; transferring the treated fluid to a combination flotation-filtration vessel; and removing at least some of the floc and other contaminants via flotation and filtration within the combination flotation-filtration vessel to form a treated product. Components, units, etc. of the method may be in accordance with embodiments herein.

Still further embodiments pertain to a water treatment process that may include any of the steps of: associating the water treatment process with an offshore operation; receiving a water stream comprising contaminants into a combination flotation-filtration vessel; injecting an injection stream into the flotation vessel to interact with the water stream; removing floc from the treated water stream to form a secondary treated water stream; filtering the secondary treated water stream in a filtration zone to form a treated water product; and discharging at least some of the treated water product into the ocean. Components, units, etc. of the method may be in accordance with embodiments herein.

Advantages

Embodiments of the disclosure advantageously provide for improved fluid treatment useable with a wide array of applications.

Embodiments herein may provide for EC fluid treatment having a significantly reduced footprint over conventional treatment options. Other advantages include ability to significantly remove contaminants that may be toxic to sea life. The in-situ chemistry alleviates the reliance on other chemicals need for conventional chemical treatment. The EC fluid treatment of the disclosure may be suitable to completely kill bacteria, and work in low-conductivity systems to which conventional EC is ineffective.

Treatment residence time within an EC unit disclosed herein may occur rapidly (under a minute) marking a radical advantage over conventional treatment options. Embodiments herein may be scalable and modular for high flow rates operations and/or constrained spatial requirements.

Advantageously one or more of electrolytic oxidation, emulsion destabilization, electrocoagulation, flocculation, flotation, and filtration may occur in a single combination unit. Combination units take up less space, and provide a smaller footprint. The use of a single unit over, for example, multiple units, means less space, utility, instrumentation, and thus overall reduced capital expenditure. Easier and smaller also means less energy and less operational resources, and thus overall reduced operational Embodiments herein may advantageously be used to treat a wide range of contaminants, organics, inorganics, metals, biologicals, with a single technology type.

Other advantages may include waste minimization, reduced storage logistics, reduced liability exposure from handling waste, reduced energy consumption, and the ability to use a waste to treat a waste.

Embodiments of the disclosure advantageously provide for new and innovative systems, hardware, software, and related methods, for treating a fluid. One or more embodiments herein may be retrofitted to existing equipment. Embodiments of the disclosure advantageously provide for new and durable equipment units useable separately or together in a wide range of onshore and offshore environments where fluid treatment is desirous.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of any claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. An electrocoagulation unit comprising:
   an outer shell, the outer shell further comprising:
      a fluid inlet;
      a fluid outlet;
      a first busbar opening;
      a second busbar opening;
   an inner housing coupled with the outer shell;
   a set of electrodes disposed within the inner housing, each electrode being separated from an adjacent electrode by an electrode gap;
   a first pressure gland assembly sealingly coupled with the first busbar opening, the first pressure gland assembly further comprising a first gland power bar disposed within a first gland body;
   a second pressure gland assembly sealingly coupled with the second busbar opening, the second pressure gland assembly further comprising a second gland power bar disposed within a second gland body;
   a first busbar coupled with the first gland power bar, and further coupled with every other electrode of the set of electrodes;
   a second busbar coupled with the second gland power bar, and further coupled in an alternating manner with every electrode of the set of electrodes not coupled with the first busbar; and
   a plurality of sacrificial media disposed between each respective adjacent pair of electrodes.

2. The electrocoagulation unit of claim 1, wherein an at least one of the set of electrodes comprises a cumulative surface area in a range of 1000 inches to 2000 inches, and an electrode thickness in a thickness range of 0.1 inches to 2.5 inches.

3. The electrocoagulation unit of claim 1, wherein the electrode gap between an at least two of the set of electrodes comprises a distance of 4 inches to 8 inches.

4. The electrocoagulation unit of claim 1, wherein each of the set of electrodes comprises a cumulative surface area in a range of 1000 inches to 2000 inches, and an electrode thickness in a thickness range of 0.1 inches to 2.5 inches, and wherein the electrode gap between each adjacent electrode of the set of electrodes comprises a distance of 4 inches to 8 inches.

5. The electrocoagulation unit of claim 1, wherein the sacrificial media comprises a set of perforations in a range of 3 perforations to 9 perforations, wherein a media thickness of the sacrificial media is in a range of 0.001 inches to 0.005 inches.

6. The electrocoagulation unit of claim 1, wherein each of the first busbar and the second busbar comprises a main busbar body made of conductive metal, wherein at least one of the main busbar bodies comprises a first surface portion coated with a dielectric material, and a second surface portion coated with a conductive material.

7. The electrocoagulation unit of claim 6, wherein an at least one electrode of the set of electrodes comprises a main electrode body made of platinum, and an outer electrode surface coating selected from a group consisting of any noble metal, wherein the at least one electrode is coupled with its respective busbar via a jumper, and wherein the jumper comprises a first jumper surface portion coated with the dielectric material, and a second jumper surface portion coated with the conductive material.

8. The electrocoagulation unit of claim 1, wherein an at least one electrode of the set of electrodes comprises a main electrode body made of platinum, and an outer electrode surface coating selected from a group consisting of any noble metal.

9. An electrocoagulation unit comprising:
an outer shell, the outer shell comprising:
a first busbar opening;
an inner housing within the outer shell;
a set of electrodes disposed within the inner housing, each electrode being separated from an adjacent electrode by an electrode gap;
a first pressure gland assembly sealingly coupled with the first busbar opening, the first pressure gland assembly further comprising a first gland power bar disposed within a first gland body;
a first busbar coupled with the first gland power bar, and further coupled with every other electrode of the set of electrodes; and
a plurality of sacrificial media disposed between each respective adjacent pair of electrodes.

10. The electrocoagulation unit of claim 9, wherein an at least one of the set of electrodes comprises a cumulative surface area in a range of 1000 inches to 2000 inches, and an electrode thickness in a thickness range of 0.1 inches to 2.5 inches.

11. The electrocoagulation unit of claim 10, the electrode gap between an at least two of the set of electrodes comprises a distance of 4 inches to 8 inches.

12. The electrocoagulation unit of claim 11, wherein each of the set of electrodes comprises a cumulative surface area in a range of 1000 inches to 2000 inches, wherein the sacrificial media comprises a set of perforations in a range of 3 perforations to 9 perforations, and wherein a media thickness of the sacrificial media is in a range of 0.001 inches to 0.005 inches.

13. The electrocoagulation unit of claim 11, wherein the first busbar comprises a main busbar body made of a conductive metal, and further comprises a first surface portion coated with a dielectric material, and a second surface portion coated with a conductive material.

14. The electrocoagulation unit of 13, wherein an at least one electrode of the set of electrodes comprises a main electrode body made of platinum, and an outer electrode surface coating selected from a group consisting of any noble metal, wherein the at least one electrode is coupled with the first busbar via a jumper, and wherein the jumper comprises a first jumper surface portion coated with the dielectric material, and a second jumper surface portion coated with the conductive material.

15. The electrocoagulation unit of claim 9, the unit further comprising: a fluid inlet; a fluid outlet; a second busbar opening, a second pressure gland assembly sealingly coupled with the second busbar opening, the second pressure gland assembly further comprising a second gland power bar disposed within a second gland body; and a second busbar coupled with the second gland power bar, and further coupled in an alternating manner with every electrode of the set of electrodes not coupled with the first busbar, wherein a media thickness of the sacrificial media is in a range of 0.001 inches to 0.01 inches.

16. An electrocoagulation unit comprising:
an outer shell comprising a first busbar opening;
an inner housing within the outer shell;
a set of 4 to 10 electrodes disposed within the inner housing, each electrode being separated from an adjacent electrode by an electrode gap in a range of 5 inches to 7 inches;
a first pressure gland assembly sealingly coupled with the first busbar opening, the first pressure gland assembly further comprising a first gland power bar disposed within a first gland body;
a first busbar coupled with the first gland power bar, and further coupled with every other electrode of the set of electrodes; and
a plurality of sacrificial media disposed between each respective adjacent pair of electrodes, wherein each of the set of electrodes comprises a cumulative surface area in a range of 1000 inches to 2000 inches, and wherein the first busbar comprises a main busbar body made of a conductive metal, and further comprises a first surface portion coated with a dielectric material, and a second surface portion coated with a conductive material.

17. The electrocoagulation unit of 16, wherein an at least one electrode of the set of electrodes comprises a main electrode body made of platinum, and an outer electrode surface coating selected from a group consisting of any noble metal, wherein the at least one electrode is coupled with the first busbar via a jumper, and wherein the jumper comprises a first jumper surface portion coated with the dielectric material, and a second jumper surface portion coated with the conductive material.

18. The electrocoagulation unit of claim 16, the outer shell further comprising: a fluid inlet; a fluid outlet; a second busbar opening, wherein a second pressure gland assembly is sealingly coupled with the second busbar opening, the second pressure gland assembly further comprising a second gland power bar disposed within a second gland body; and a second busbar coupled with the second gland power bar, and further coupled in an alternating manner with every electrode of the set of electrodes not coupled with the first busbar.

\* \* \* \* \*